US009916956B1

(12) United States Patent
Rauckman et al.

(10) Patent No.: US 9,916,956 B1
(45) Date of Patent: Mar. 13, 2018

(54) CUTOUT COVER

(71) Applicant: GATO ASSETS, LLC, Belleville, IL (US)

(72) Inventors: James B. Rauckman, Swansea, IL (US); David W. McGuire, Jerseyville, IL (US)

(73) Assignee: Gato Assets, LLC, Belleville, IL (US)

( * ) Notice: Subject to any disclaimer, the term of this patent is extended or adjusted under 35 U.S.C. 154(b) by 0 days.

(21) Appl. No.: 15/276,306

(22) Filed: Sep. 26, 2016

Related U.S. Application Data

(60) Provisional application No. 62/232,172, filed on Sep. 24, 2015.

(51) Int. Cl.

| | |
|---|---|
| ***H01H 85/25*** | (2006.01) |
| ***H02B 1/06*** | (2006.01) |
| ***H02H 5/04*** | (2006.01) |
| ***H01B 17/58*** | (2006.01) |
| ***B29C 45/16*** | (2006.01) |
| ***B29C 45/26*** | (2006.01) |
| ***H01H 85/00*** | (2006.01) |
| ***H01H 85/175*** | (2006.01) |
| ***H01H 69/02*** | (2006.01) |

(52) U.S. Cl.
CPC ......... *H01H 85/25* (2013.01); *B29C 45/1676* (2013.01); *B29C 45/2673* (2013.01); *H01H 69/02* (2013.01); *H01H 85/0026* (2013.01); *H01H 85/175* (2013.01)

(58) Field of Classification Search
CPC .... H01H 85/25; H01H 69/02; H01H 85/0026; H01H 85/175; B29C 45/1676; B29C 45/2673
USPC ................................ 337/337, 361, 439, 174
See application file for complete search history.

(56) References Cited

U.S. PATENT DOCUMENTS 2,263,319 A * 11/1941 Treanor ................. H01B 17/26 174/139
3,692,927 A * 9/1972 Ellaschuk ................ H02G 7/00 174/139
4,845,307 A * 7/1989 Cumming ............. H01B 17/26 174/138 F
6,255,597 B1 * 7/2001 Bowling ................ H01B 17/00 174/138 F
6,291,774 B1 * 9/2001 Williams ............... H01B 17/00 174/135
6,963,025 B1 * 11/2005 Kysely .................. H01B 17/00 174/138 F (Continued)

OTHER PUBLICATIONS

Photographs of Cutout Cover, 1 page, Admitted Prior Art .

(Continued)

*Primary Examiner* — Anatoly Vortman
(74) *Attorney, Agent, or Firm* — Senniger Powers LLP

(57) ABSTRACT

A fuse cutout assembly cover including an insulator cover end for positioning over a cutout assembly insulator and including a shield end for shielding a cutout upper contact assembly. An intermediate portion between the insulator cover end and the shield end can have detents for retaining the cover in place on the fuse cutout assembly. The fuse cutout cover can include a plurality of hole and slot arrangements to provide multiple access sites for an installation tool such as a shotgun stick or other hot stick tool. Methods of manufacturing fuse cutout assembly covers are also disclosed.

16 Claims, 26 Drawing Sheets

(56) References Cited

U.S. PATENT DOCUMENTS

| | | | | |
|---|---|---|---|---|
| 6,995,313 | B1 * | 2/2006 | Barnett | H01B 17/00 174/138 F |
| 7,276,665 | B1 * | 10/2007 | Rauckman | H01B 17/00 174/135 |
| 7,297,869 | B2 * | 11/2007 | Hiller | H01B 17/00 119/174 |
| 7,786,841 | B2 | 8/2010 | Kesting | |
| 8,723,056 | B2 * | 5/2014 | Kaddas | H02G 7/00 174/135 |
| 9,787,071 | B1 * | 10/2017 | Rauckman | H02G 3/081 |
| 2004/0184210 | A1 * | 9/2004 | Lynch | H01H 31/006 361/104 |

OTHER PUBLICATIONS

Kaddas Catalog, Wildlife Power Outage Protection Products BirdguarD™ Line, www.kaddas.com, 24 pages, Admitted Prior Art, 2016.

* cited by examiner

CUTOUT COVER

CROSS REFERENCE TO RELATED APPLICATION

This application is the nonprovisional of U.S. Provisional Patent Application No. 62/232,172, filed Sep. 24, 2015, which is hereby incorporated by reference in its entirety.

FIELD

This disclosure relates generally to covers for fuse cutout assemblies employed in electric energy distribution systems and more particularly to a cover for protecting the cutout from invasion by wildlife, such as birds or squirrels which can result in death of the animal and/or interruption of electrical service.

BACKGROUND

Utility companies, particularly electric companies, employ cutout assemblies which include removable fuse tubes or fuse holders in electric energy distribution systems. The devices, usually energized to 7200 volts, generally include an insulator mounted on a bracket having spaced contact assemblies. A lower contact assembly has mount structures, and an upper contact assembly includes an integral latching member, usually spring loaded. A fuse holder with an internal fuse link includes a lower end with opposing contacts adapted to attach to the mounts. The upper end of the fuse tube has a latching contact end shaped for engagement with the upper contact assembly of the bracket. The fuse holder is removably positioned both physically and electrically in parallel with the insulator.

In an overcurrent situation, the fuse link melts, causing the fuse holder to drop and pivot downward. In order to replace the fuse link, the fuse holder has to be removed from the cutout body. Removal of the fuse holder is generally accomplished by engaging the operating end of an extended hot stick with the fuse holder near the bottom. The fuse holder is lifted out of the cutout assembly and the fuse link replaced. In other instances, it may be necessary to open the circuit at the cutout assembly even while current is flowing through the fuse link in the fuse holder, by pulling the fuse holder to open the circuit. Anytime there is voltage present a load break tool is used to pull the fuse holder open while inhibiting arcing. The fuse holder is pulled away from the upper contact cutting off electricity at the location of the cutout assembly.

Wildlife, such as birds or squirrels can access the fuse cutout assembly and build nests, which may catch fire, particularly if a fuse link blows, or be electrocuted by touching an energized area of the fuse cutout assembly and ground. The electrocution of the wildlife may cause the fuse link to blow, resulting in a power outage. If the wildlife is a protected species such as a red-tailed hawk the utility company may be required to report the bird's death and be required to take measures to prevent further incidents.

Various cutout covers have been employed to cover the fuse cutout assembly to prevent access by wildlife, all with mixed results. In general, a shotgun stick (or other type of hot stick) is used to install the conventional cutout covers over the fuse cutout assembly. In other cases insulating rubber gloves are used to install the prior art cutout covers. Known cutout covers generally have limited applicability. In other words, they are generally designed to fit over only one size or configuration of a fuse cutout assembly. Often these cutout covers leave substantial room or gaps between the cover and the cutout, allowing wildlife access. Moreover, they include only one or a limited number of hot stick access points, limiting the lineman's ability to grasp and install the cover at various angles. Also, they require the use of separate securing structure, such as fasteners, pins or buttons to hold the cover in place and prevent dislodgment by wind.

SUMMARY

In a first aspect, the present disclosure is directed to a fuse cutout cover for a fuse cutout assembly including a fuse and an upper contact assembly for engaging an upper end of the fuse. The cover includes an insulator cover configured for covering at least a portion of an upper end of the insulator. The cover includes a contact assembly shield configured for shielding at least a portion of the upper contact assembly. The cover includes an intermediate portion operatively connecting the insulator cover and the contact assembly shield and molded as one piece of material with the insulator cover and contact assembly shield. The intermediate portion includes at least one detent configured for catching on a portion of the fuse cutout assembly for retaining the cutout cover on the fuse cutout assembly. The contact assembly shield has a top wall portion and side wall portions defining a mouth opening in a direction away from the insulator cover. Each of the top wall portion and side wall portions has holes therein sized and shaped for receiving a hot stick tool to manipulate the fuse cutout cover.

In a second aspect, the present disclosure is directed to a fuse cutout cover for a fuse cutout assembly including an insulator, a fuse, and an upper contact assembly for engaging an upper end of the fuse. The cover includes an insulator cover configured for covering at least an upper end of the insulator. The cover includes a contact assembly shield configured for shielding at least a portion of the upper contact assembly. The cover includes an intermediate portion operatively connecting the insulator cover and the contact assembly shield. The intermediate portion includes at least one wall section and at least one detent configured to engage the fuse cutout assembly to retain the cutout cover on the fuse cutout assembly in a position in which the insulator cover portion covers at least said portion of the upper end of the insulator and the contact assembly shield shields at least said portion of the upper contact assembly. The at least one wall section is formed of a first material, and the at least one detent is formed of a second material different from the first material.

In yet another aspect, the present disclosure is directed to a method of manufacturing a fuse cutout cover for a fuse cutout assembly. The method includes molding an insulator cover, a contact assembly shield, an intermediate portion connecting the insulator cover to the contact assembly shield, and at least one detent on the intermediate portion. The insulator cover is configured for covering at least a portion of an insulator of the fuse cutout assembly. The shield is configured for shielding at least a portion of an upper contact assembly of the fuse cutout assembly. The detent is configured for engaging the fuse cutout assembly for retaining the fuse cutout cover on the fuse cutout assembly. The insulator cover is molded in a molding step, and the at least one detent is molded in a different molding step.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
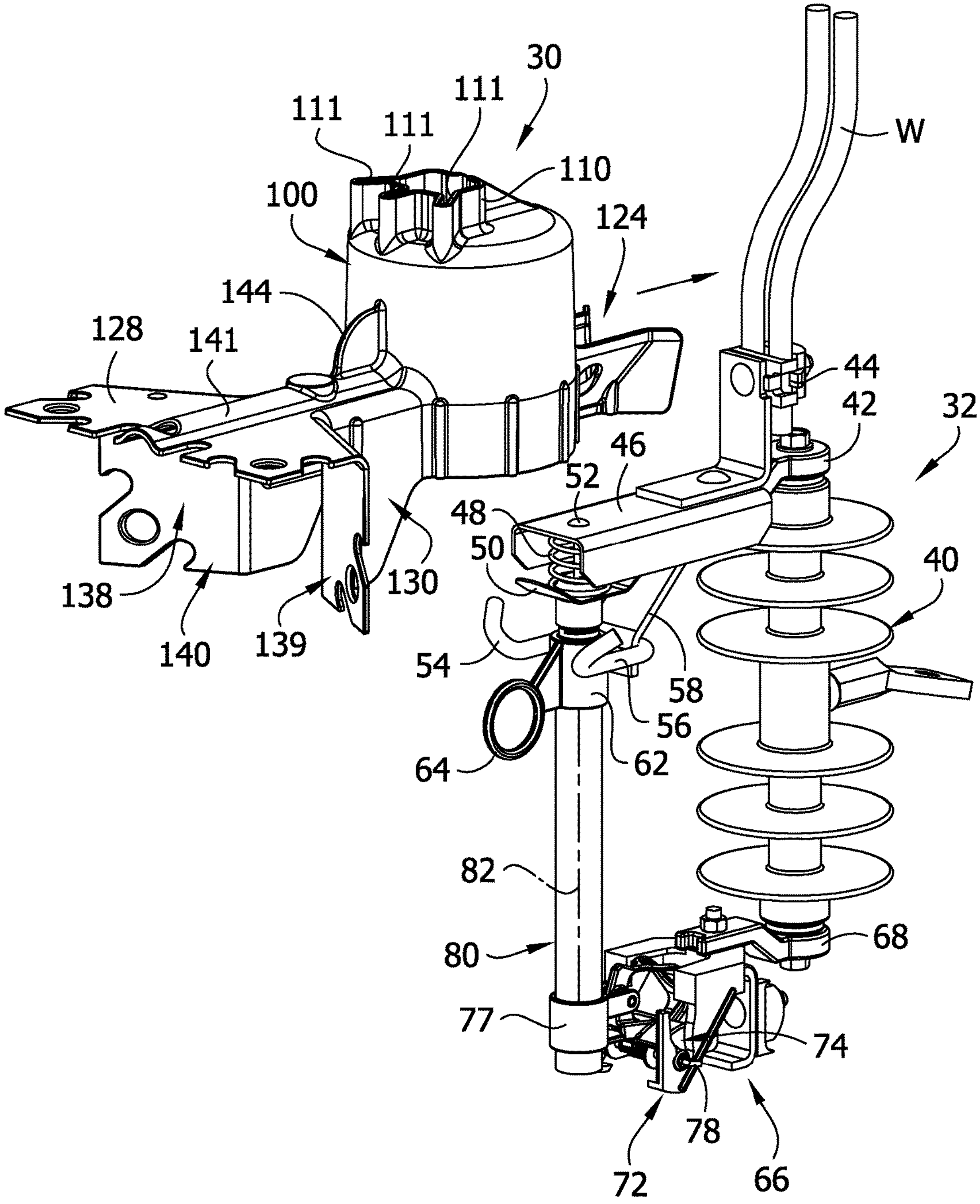
FIG. 1 is a perspective of an aspect of a cutout cover adjacent a fuse cutout assembly.

A cutout cover of the present disclosure is indicated generally by reference number 30 in the various drawings. The cutout cover 30 is intended to be mounted or installed on a fuse cutout assembly, indicated generally by reference number 32. The conductive elements of a fuse cutout are usually energized at 7200 volts and could be energized up to 20,000 volts with respect to ground. In most instances, the cover 30 is installed with a shotgun stick (a type of hot stick), represented generally by number 34 in FIG. 2. In this embodiment, shotgun stick 34 includes a retractable spike and a hook arrangement 36 and is used in a manner as will be described in relation to the cover 30 hereinafter.

Figure 2:
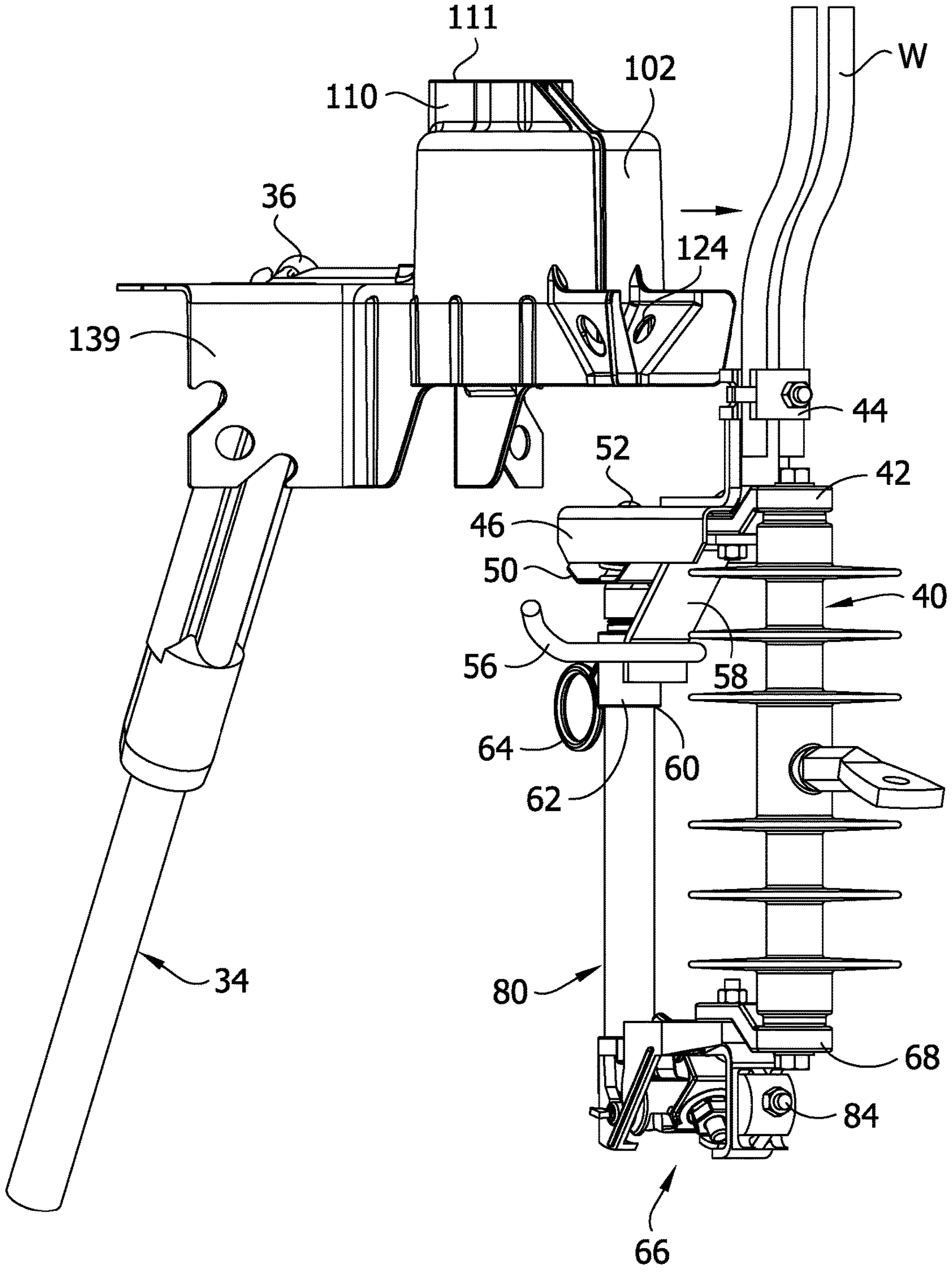
FIG. 2 is a perspective of an aspect of a cutout cover adjacent a fuse cutout assembly and a cutout cover carried by a shotgun stick used to mount the cutout cover.
Figure 3:
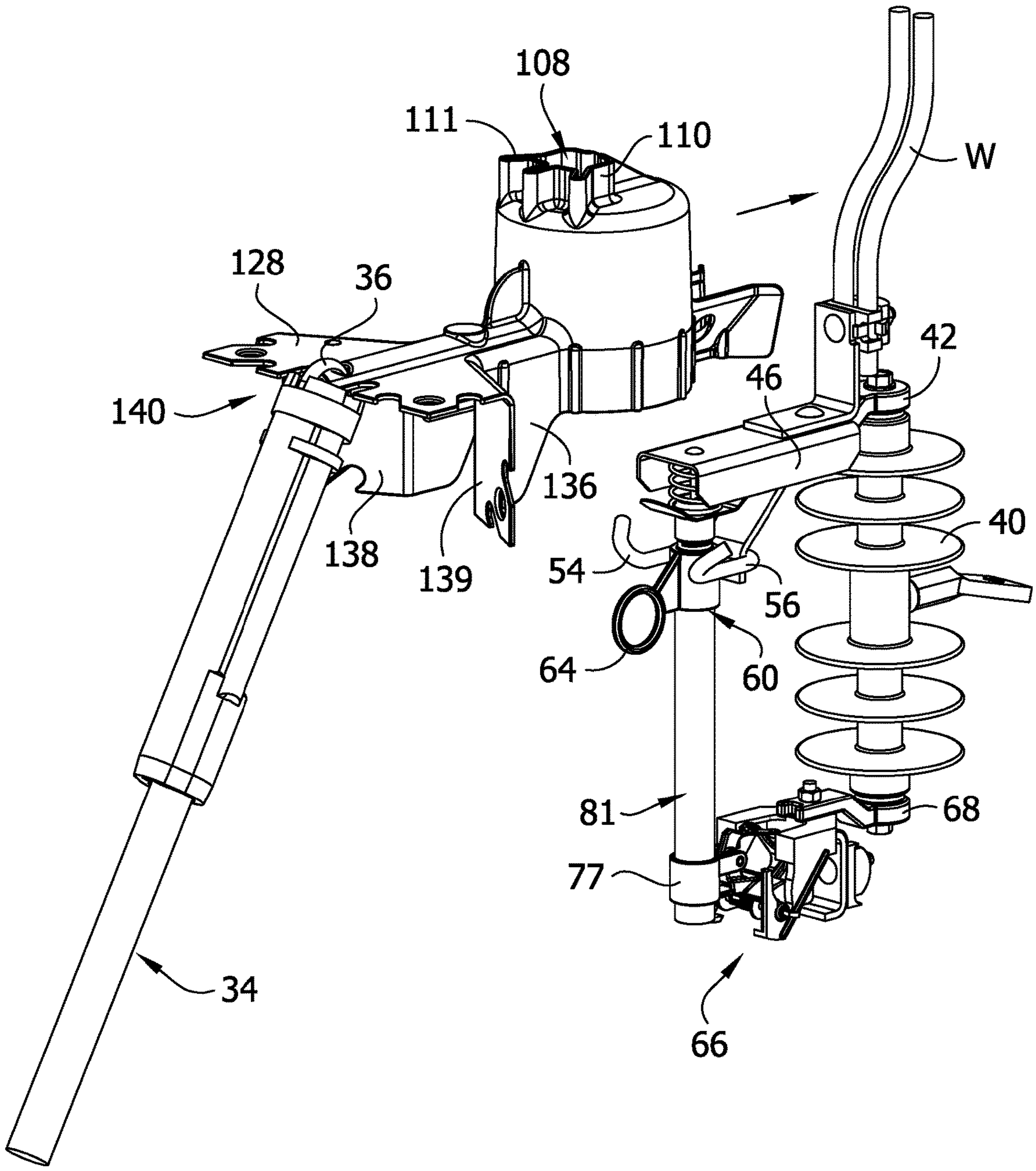
FIG. 3 is the perspective of FIG. 2 from a vantage behind the cutout assembly.

As shown in FIGS. 1 and 2, the cutout assembly 32 generally includes an insulator 40 desirably constructed from a dielectric material such as polymer or ceramic. A frame member 42 at the upper end of the insulator is connected to an upper contact assembly comprising an upper conductive terminal 44 energized by wires W, a metal channel commonly referred to as a sleet hood 46, an ejector spring 48, and a spring biased contact 50. The contact 50 is operatively connected to a rivet 52. A pair of opposed hooks 54, 56 provide for the removable attachment of a load break tool or other tools, as known in the art and as will be further explained below. The hooks 54 and 56 are electrically connected to the conductive terminals by a connector bridge 58. A top fuse tube casting 60, generally cast from bronze, includes a fuse ferrule 62 and a pull ring 64.

Figure 8:
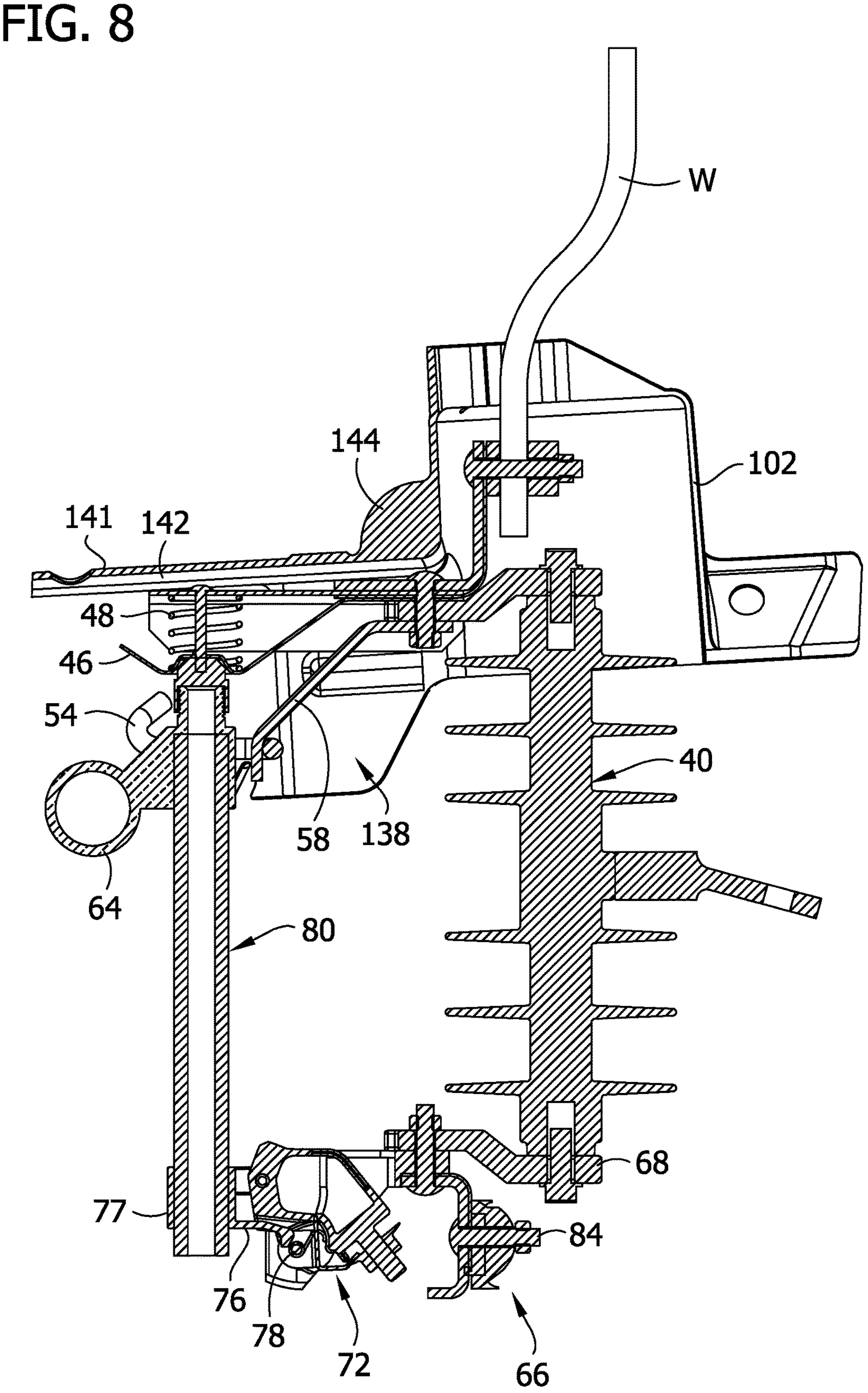
FIG. 8 is a section taken in the plane including line 8-8 of FIG. 7.
Figure 9:
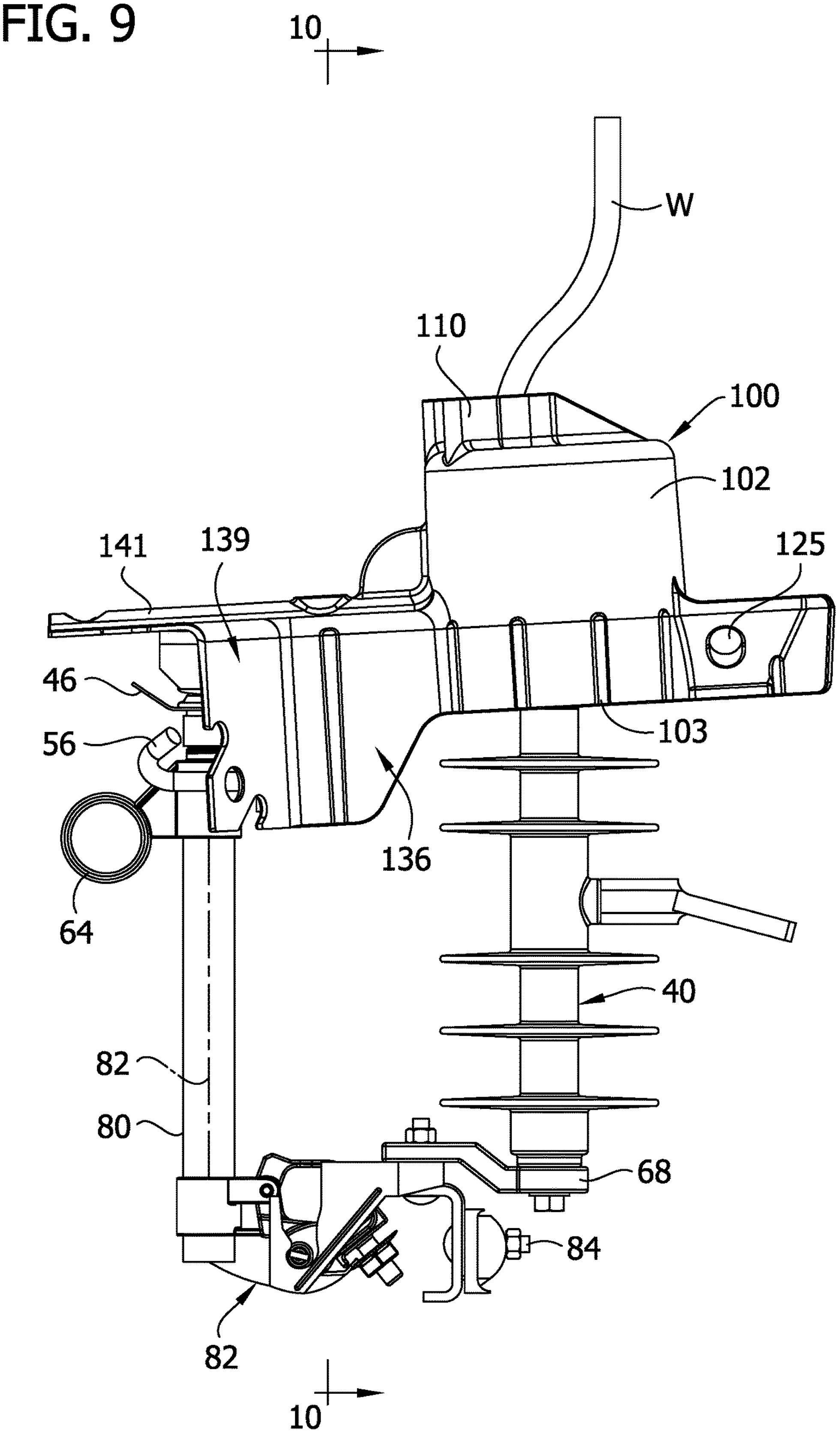
FIG. 9 is a side elevation thereof.

A lower contact assembly 66 is connected to the insulator by frame member 68. The lower contact assembly 66 comprises a trunnion 72, generally cast from bronze, having a trunnion pocket 74 and a lower fuse tube casting 76 including a ferrule 77 (see, e.g., FIG. 8). In general, the lower fuse tube casting 76 includes a hinge 78 that rotatingly seats in the trunnion pocket 74.

A conventional fuse tube 80 is mounted in ferrules 62 and 77 and extends between the upper and lower contact assemblies. The fuse tube 80 is of conventional design comprising a high strength fiberglass tube housing a fuse link 82 as known in the art and which functions in a manner known in the art. The trunnion 72 includes a fuse link connection nut 84 (FIG. 8) for attachment of the bottom end of fuse link 82 which is in electrical connection with lower terminal 70. The fuse link 82 extends around the trunnion to create tension on the fuse link when fuse tube is installed. The fuse link 82 provides electrical contact with the lower contact assembly 66.

Figure 18:
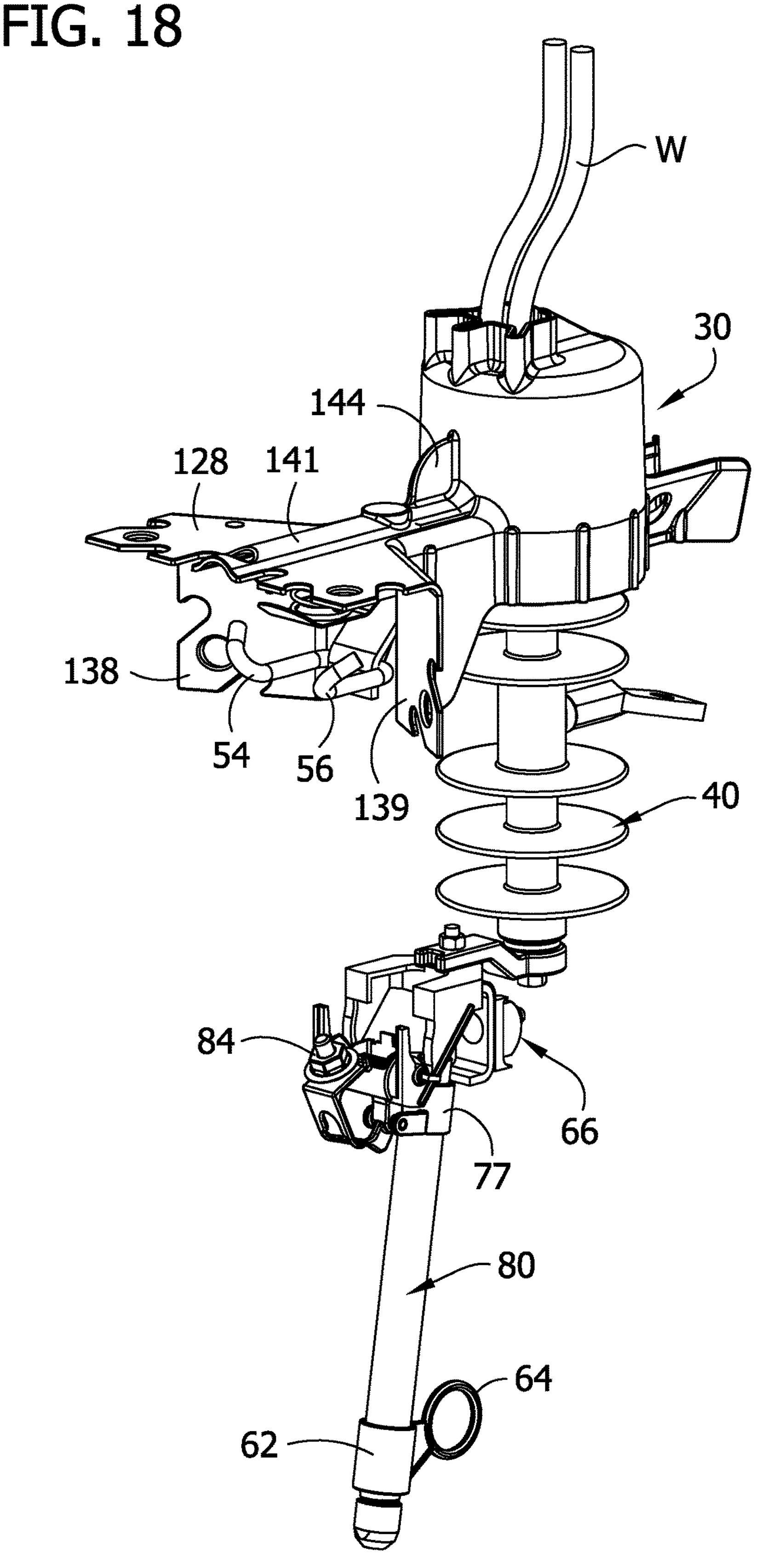
FIG. 18 is a front perspective of the cutout cover mounted on a cutout assembly with the fuse tube disengaged.

When installed, the fuse link 82 is electrically connected between the upper contact and the lower contact. It will be appreciated that, when the contained fuse link operates ("blows"), there can be an electrical arc within the fuse tube that heats condensate and produces a buildup of steam or inert gasses. When the fuse link blows, tension is released and the fuse tube drops down and pivots around the hinge 78 and hangs from the hinge providing visible indication that the fuse link has operated and assurance that the circuit is open (see, FIG. 18). Cutouts are typically mounted about 20 degrees off vertical so that the center of gravity of the fuse holder is displaced and the fuse holder will rotate and fall open under its own weight when the fuse blows.

Cutout fuses may be opened manually to interrupt service. In such a situation, a tool, such as a hot stick, can be used to grasp the pull ring 64 and disconnect the top end of the fuse tube 80 to interrupt service. Those skilled in the art will recognize that disconnecting the fuse tube when the fuse is energized creates a high risk of arcing between the top terminal and the upper fuse tube casting or other conductive elements. To eliminate this risk, the technician employs a load break tool, such as a Loadbuster® tool (available from S & C Electric Company, 6601 North Ridge Boulevard, Chicago, Ill. 60626), as indicated by reference number 86 in FIGS. 19 and 20. As shown, the load break tool 86 is secured to the end of a hot stick 87. The load break tool 86 comprises a cylindrical body 88 with an inner tube assembly 89 slidingly engaged within the cylindrical body. There is a resetting latch 92 on the cylindrical body configured for attachment to the hot stick 87. The resetting latch 92 includes a pull ring hook 94. There is an anchor 96 at the top end of the cylindrical body 88.

Figure 19:
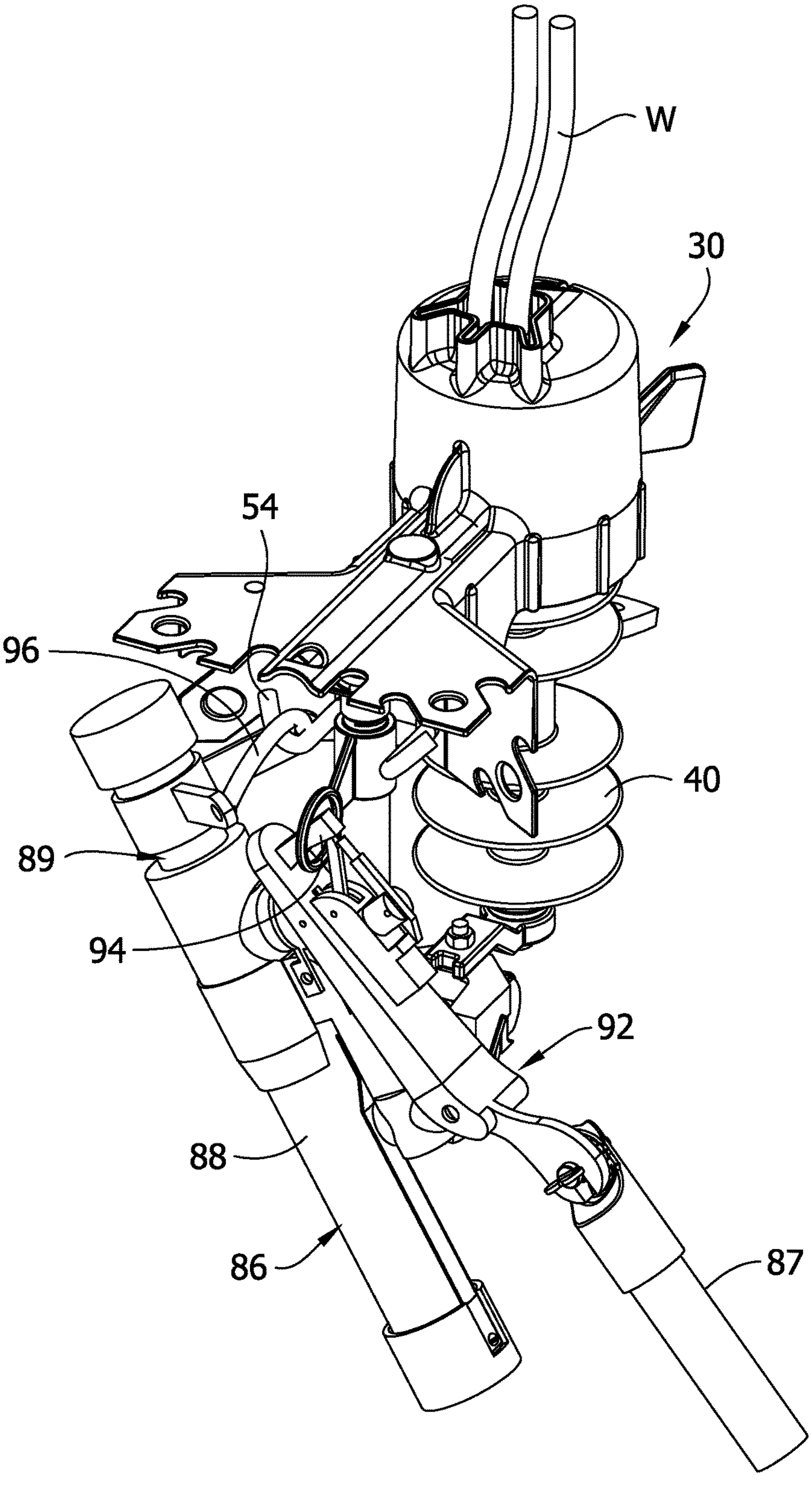
FIG. 19 is a front perspective of the cutout cover mounted on a cutout assembly with a load break tool attached to a load break hook and pull ring.
Figure 20:
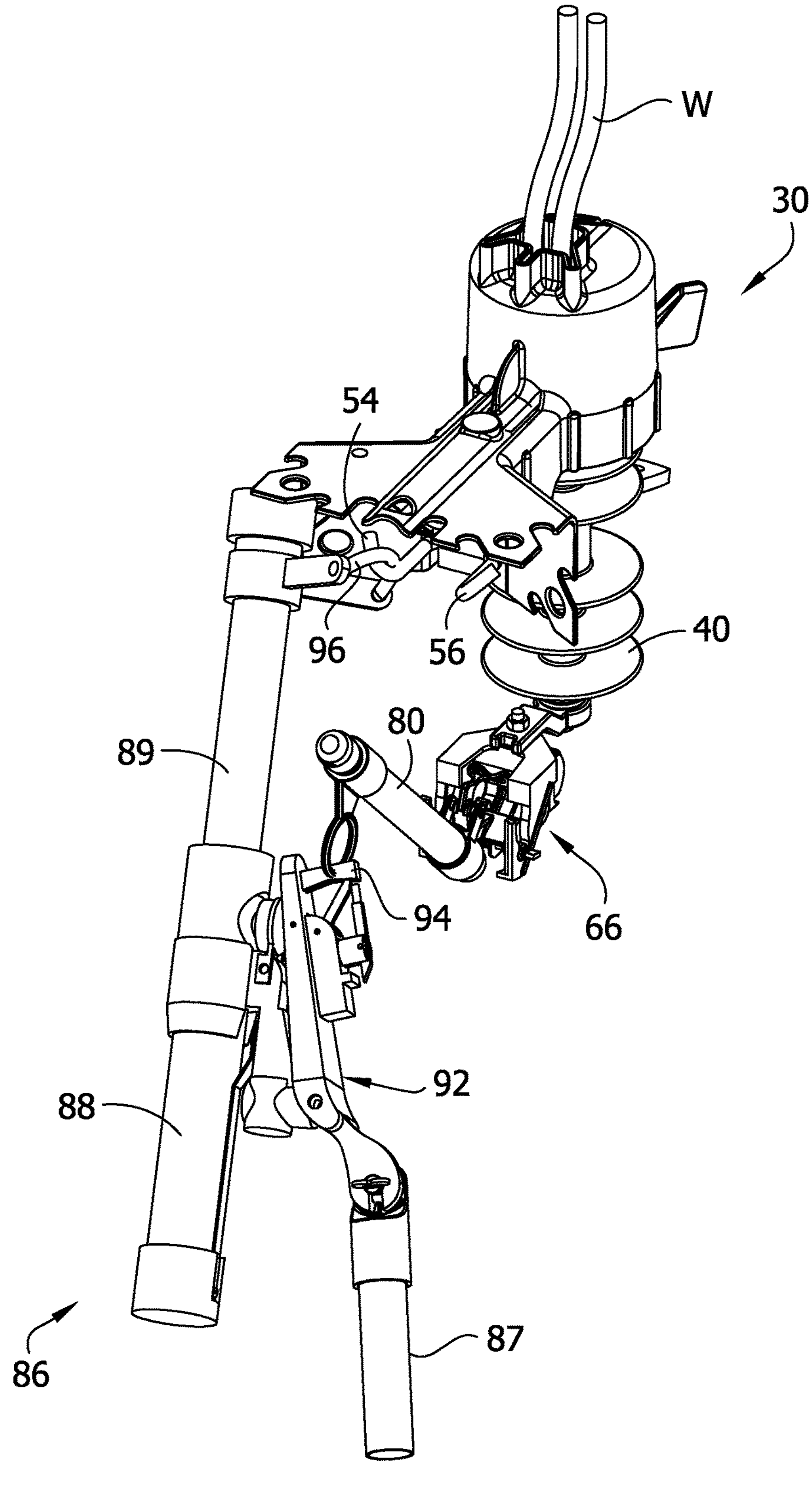
FIG. 20 is the perspective of FIG. 19 showing the fuse tube pulled to a disengaged position.
Figure 21:
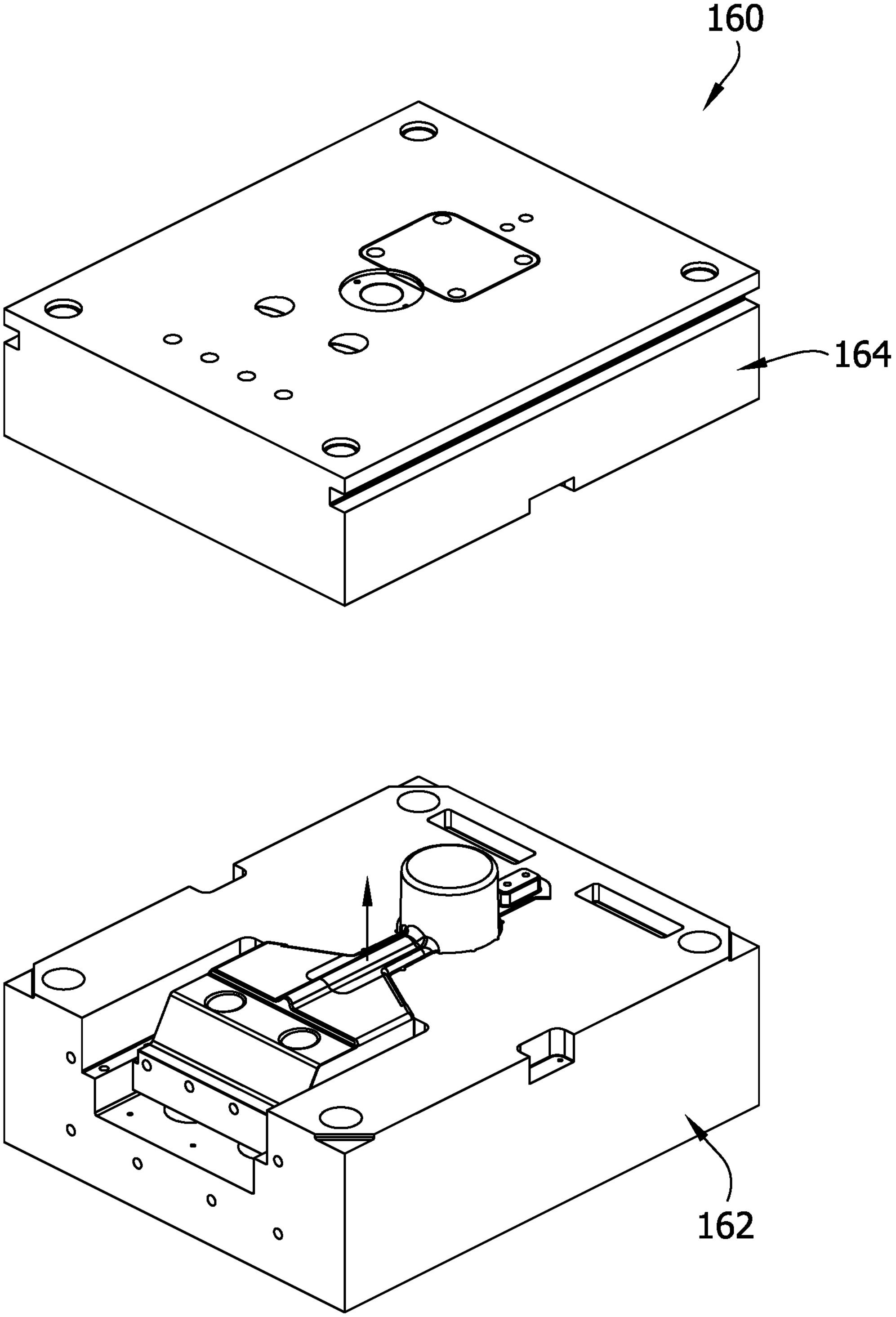
FIG. 21 is an exploded view of a cavity mold apparatus used to mold a cutout cover.

As seen in FIGS. 19 and 20, the anchor 96 is attached to one of the hooks 54 or 56. The load break tool 86 is manipulated so the pull ring hook 94 engages in the pull ring 64. The latch 92 will deflect upon complete engagement of the pull ring and spring back, locking the load break tool to the pull ring. The load break tool is now connected across the upper contact of the fuse cutout. To open the circuit, the technician operates the load break tool with a firm, steady pull, pulling the inner tube assembly 89 out of the cylindrical body 88 and the top of the fuse tube 80 out of the upper contact assembly. The latch 92 keeps the load break tool open. There may be some minor arcing, but any significant arcing is contained within the load break tool.

It will be understood that the construction of the cutout assembly may vary depending upon the manufacturer and intended function. The foregoing description of the cutout assembly 32 is intended to be a general disclosure of a typical cutout assembly with which the disclosed cutout cover may be employed. One representative embodiment of a fuse cutout assembly and related art are described in U.S. Pat. No. 7,786,841, the disclosure of which is incorporated herein by reference.

The cutout cover 30, shown in greater detail in FIGS. 12-17, is a unitary piece. While the drawings appear to show separate sections, it will be noted such dividing lines or transition points result from changes in angles or shapes of the cover and are not intended to indicate separate sections. Hence, it should be understood, the cover 30 is considered a unitary piece molded as one piece, as will be described hereinafter. However, the cover can be non-unitary. Also, reference will be made to front and rear aspects of the cover for ease of description; these are relative terms.

The cover 30 includes a first end 100, which can be broadly referred to as an insulator cover, having a hollow generally cylindrical configuration and comprising circumferential wall 102. The bottom margin of the circumferential wall 102 has external ribs 103 for added strength. The cylindrical first end 100 includes a top wall 106 and with the circumferential wall 102 defines an inner chamber 107 dimensioned to accommodate the upper end of the insulator 40. The top wall 106 includes an opening 108 defined by a circumferential wall 110, which includes three gussets 111. The wall 110 forms an access barrier around the wires. In the illustrated embodiment, the opening 108 and the wall 110 have a generally rectangular configuration and surround wires W when properly installed. Any configuration of the opening and the wall will suffice, however. The risers 112 extend from the circumferential wall 102 to the top wall 106 to provide an obstacle or impediment to an animal, such as a squirrel or bird, nesting on the cover.

Figure 4:
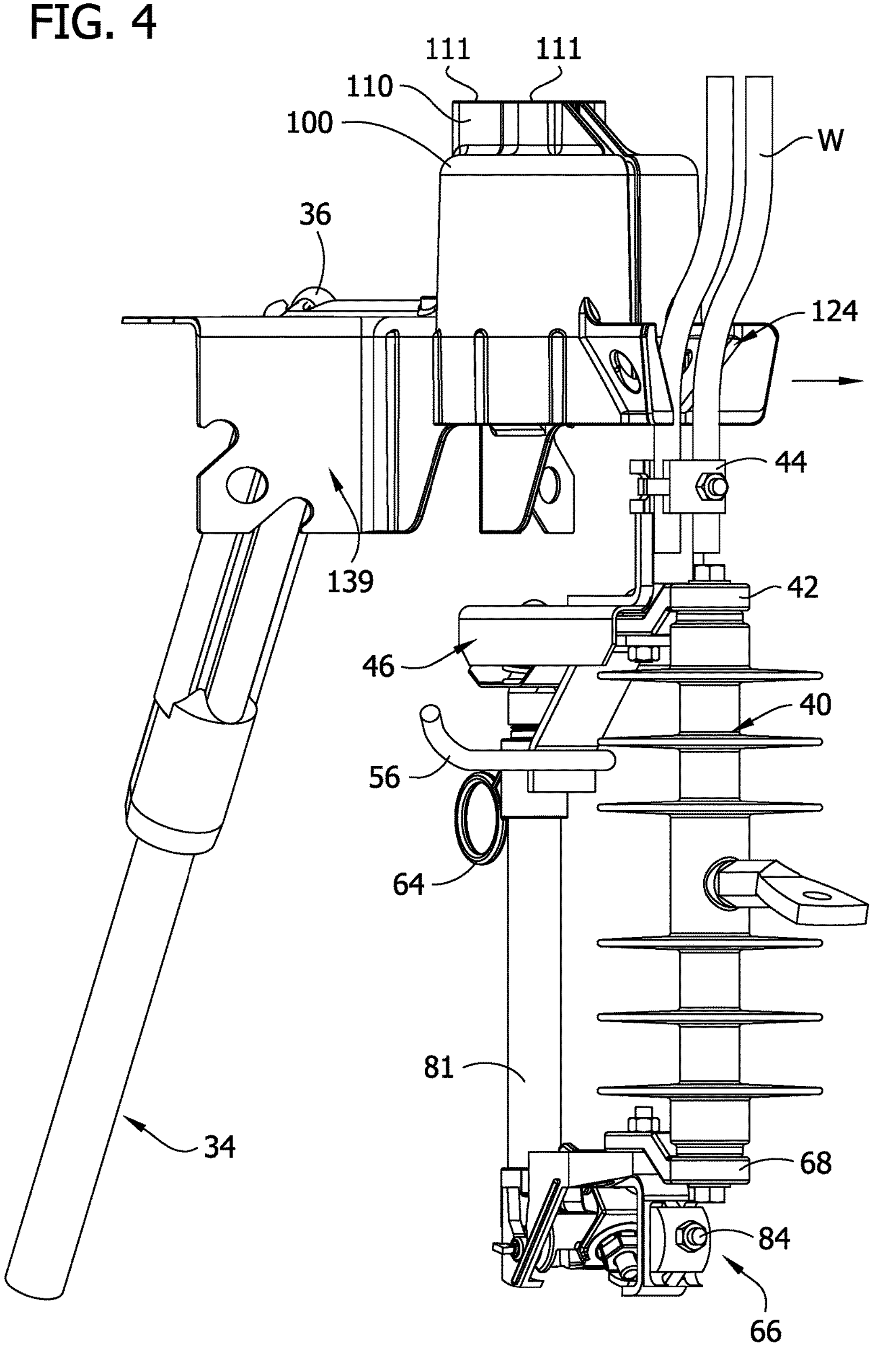
FIG. 4 is a perspective similar to FIG. 3 showing the cutout cover further advanced toward the cutout assembly.

There is a slit 114 (FIG. 14) through the wall 102 at the rear of the main portion. It will be noted the slit extends through the wall 102 and the wall 110, and is in communication with the opening 108. As seen in FIG. 4, for example, the slit 114 allows the cover to spread open for installation, as will be explained. The three gussets 111 of the wall 110 permit the cover to be opened more easily and/or wider at the slit 114 to install the cover. The gussets 111 act as living hinges, permitting the circumferential wall 110 and the top wall 106 to open sufficiently to receive the wires W and allow installation of the insulator assembly 32 into the insulator cover 100 for installation on a fuse cutout assembly. The opening 108, gussets 111 and slit 114 collectively form a “split” in the insulator cover in the illustrated embodiment. A first wing 116 extends from the wall 102 adjacent one side of the slit 114 and a second wing 118 extends from the wall 102 adjacent the opposite side of the slit 114. Each wing terminates in an outwardly splayed extension 120, 122, respectively. The splayed extensions 120 and 122 define a generally V-shaped opening 124 (see, FIGS. 15 and 16) which facilitates installation of the cover on the cutout assembly. Each wing includes a mounting hole 125 for engagement by a hot stick, such as a shotgun stick or the like.

The cover 30 includes a second end 126, which can be broadly referred to as an upper contact assembly shield, includes a substantially pentagonal top wall 128 that extends over the second end. The pentagonal top wall 128 also can be referred to as a shield-shaped wall. There is an intermediate portion defining a throat 130 between the first and second ends defined by a short top wall section 132 and vertical throat walls 134 and 136 that extend down from, and perpendicular to, the top wall section 132. The throat 130 is dimensioned to fit over and engage the upper contact assembly of a fuse cutout assembly as will be explained below.

There are perpendicular side walls 138 and 139 at right angles to the top wall 128. The side walls 138,139, with the top wall 128, define a relatively wide opening or mouth 140 that communicates with the throat section 130. There is an integral, raised, longitudinal brace 141 on the top surface of the top wall 128 defining a longitudinal channel 142. An arcuate stability fin 144 extends between the wall 102 of the insulator cover 100 and the brace 141. The fin 144 also prevents nesting or standing by an animal. There may be a hole or other opening in the fin 144 to provide another access point for installation, as will be explained.

As best seen in FIGS. 10, 11, 13, 15 and 17, a pair of opposed, longitudinally extending detents 146 and 148 are located on the inner surfaces of the throat walls 134 and 136. The detents have substantially triangular cross-sections with upwardly sloped walls 150 and 152. The detents protrude into the throat 130. As will be explained in greater detail below, the detents 146 and 148 serve to provide a positive indication to the installer that the cover is secured on the fuse cutout assembly.

The size or configuration and composition of the detents can be varied in the molding process for versatility. It should be understood that while the configuration of the detents 146 and 148 work well, the detents can have any configuration, size or the like. By way of example only, the detents can be fingers, nubs, protrusions, buttons, cones and so forth and can be arranged as discrete elements or a plurality of elements without departing from the scope of the invention. Hence, the term detent should be construed to encompass all shapes, sizes and arrangements of elements that perform a function of securing the cover on the fuse cutout assembly.

The forward edges or margins of the pentagonal wall 128 and bottom, outside corners of the perpendicular walls 138 and 139 include an arrangement of openings or holes 154 and adjacent slots 156. It will be understood that the plurality of hole and slot arrangements allow for the use of a shotgun stick (or other type of hot stick). The arrangements are provided in edge margin sections of the mouth extending in a generally horizontal plane and two generally vertical planes, and the arrangements extend at different angles with respect to each other. By way of example, a shotgun stick hook 36 can engage a hole 154 and retract, and an end portion of the stick can seat in an adjacent slot 156 for stabilization. The arrangement of shotgun stick engagement provides great versatility for mounting on a cutout assembly as will be discussed. The plurality of hole and slot arrangements provide a plurality of shotgun stick (or other hot stick) attachment points to allow an installer to attach the cover from various angles of approach.

FIGS. 1 through 6 illustrate installation of the cover 30 on a fuse cutout assembly 32 and the relative alignment of the cover on the fuse cutout cover. An installer, such as an electric lineworker or technician, can grasp the cutout cover with a shotgun stick at any convenient site, such as any one of the hole and slot combinations. Due to the presence of multiple sites, the cover 30 can be installed from just about any angle. The lineworker can install the cover by hand in the case where the cutout is not energized. The lineworker can install the cover by hand wearing electrically insulating gloves when the cutout assembly is energized. As seen in FIGS. 2 and 4, the cover 30 is advanced toward the cutout assembly. The wires W (and/or insulator connectors 44) are positioned in the V-shaped opening 124. The cover is urged onto the assembly by pushing the splayed extensions 120 and 122 against the wires W or insulator connectors 44, which act as inclined planes to force the wings 116 and 118 apart and cause the cover to open at the slit 114. As the slit 114 opens, the gussets 111 also open. It will be appreciated that the opening displacement of the slit 114 is distributed among the multiple gussets 111. In other words, the individual gussets open a fraction (e.g., about one third) of the amount the slit 114 opens. Accordingly, the gussets 111 are individually subjected to less deformation, are less prone to breaking (particularly in cold weather), and make the slit 114 easier to open. After the cover 30 is pushed sufficiently onto the fuse cutout assembly, the slit closes because of the bias of the gussets 111 and the resilient nature of the material of the cover.

Figure 5:
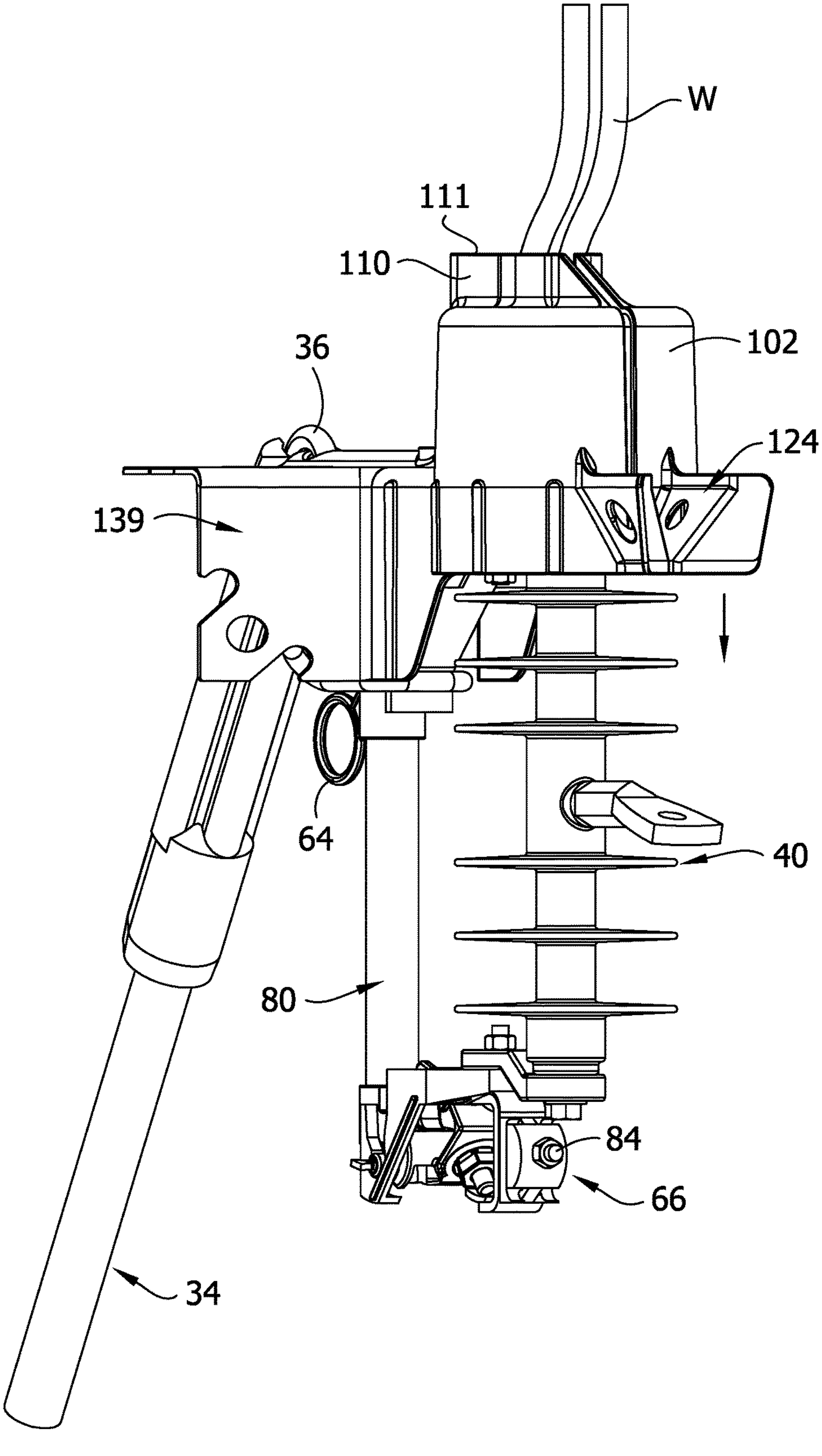
FIG. 5 is a perspective similar to FIG. 4 showing the cutout cover being moved down onto the cutout assembly.
Figure 6:
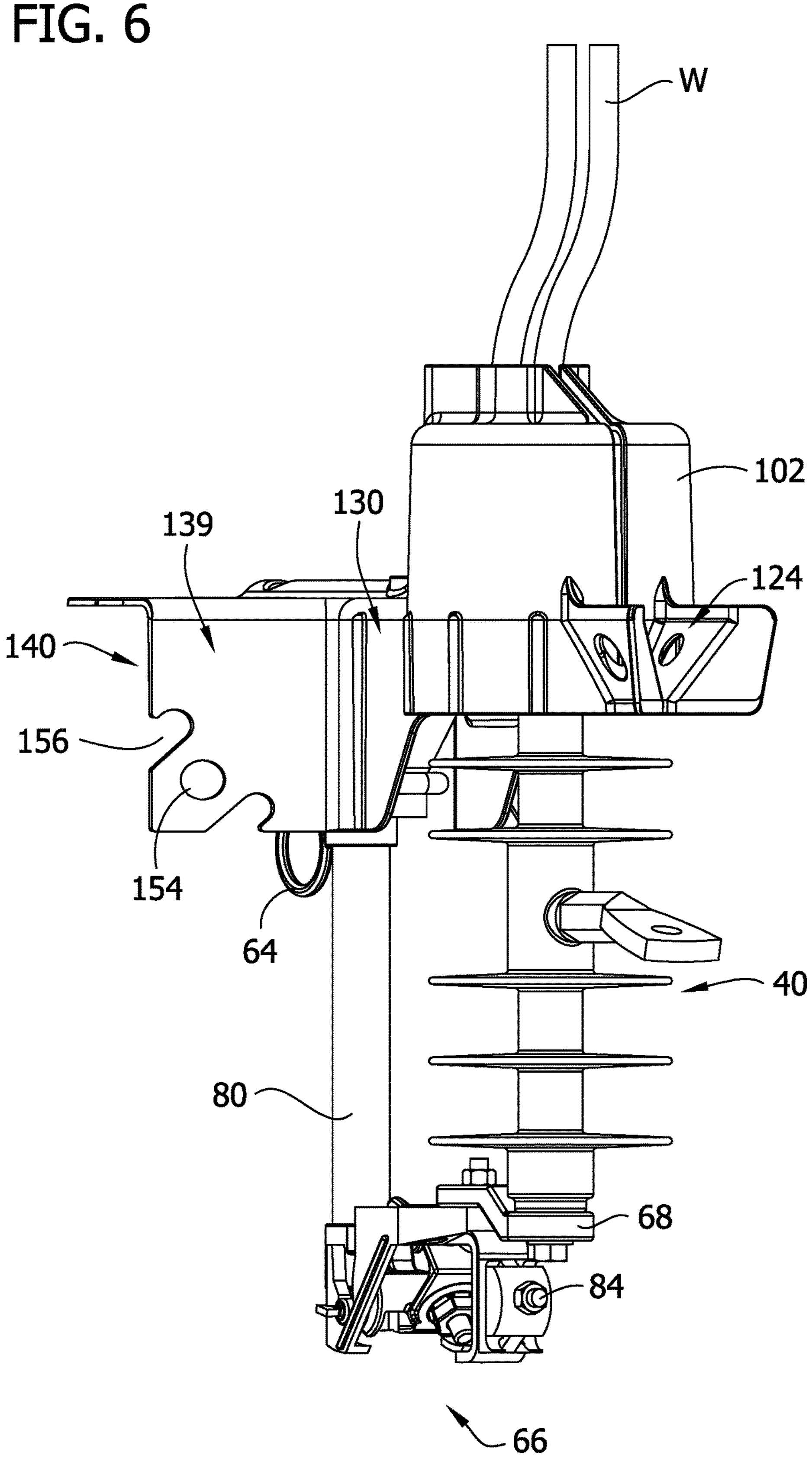
FIG. 6 is a rear perspective of a cutout cover mounted on a fuse cutout assembly.
Figure 7:
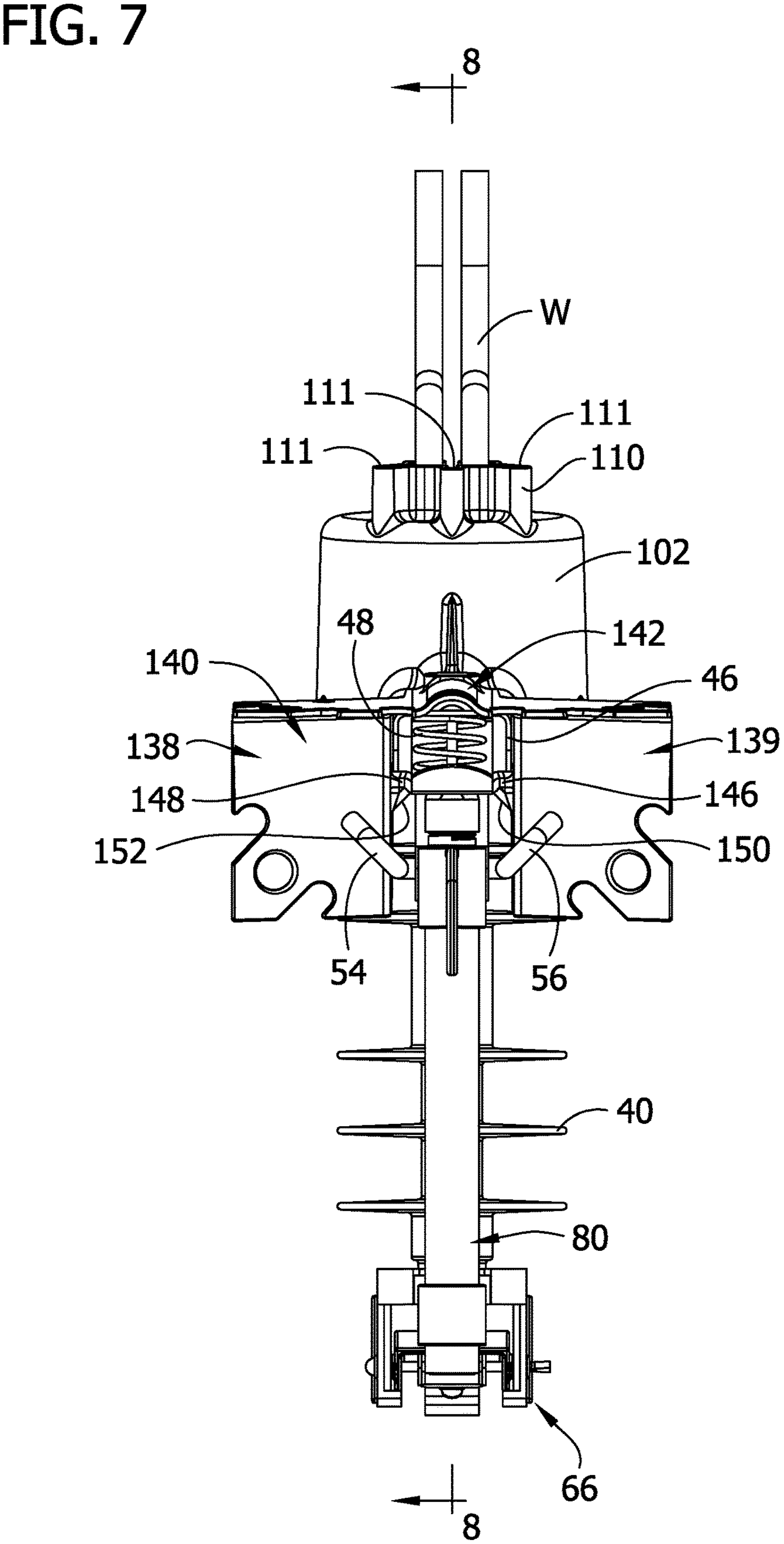
FIG. 7 is a front view thereof.
Figure 10:
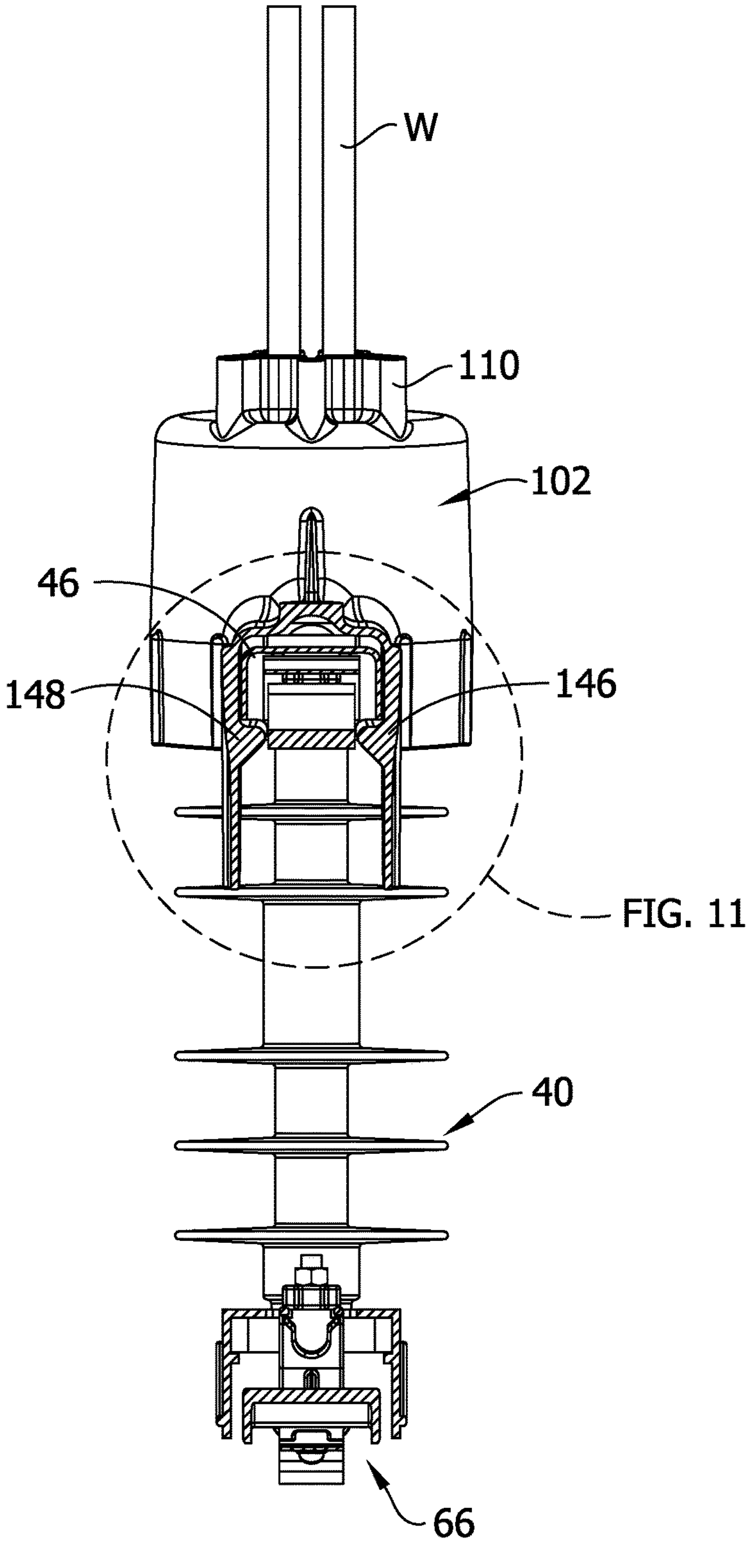
FIG. 10 is a section taken in the plane including line 10-10 of FIG. 9.
Figure 11:
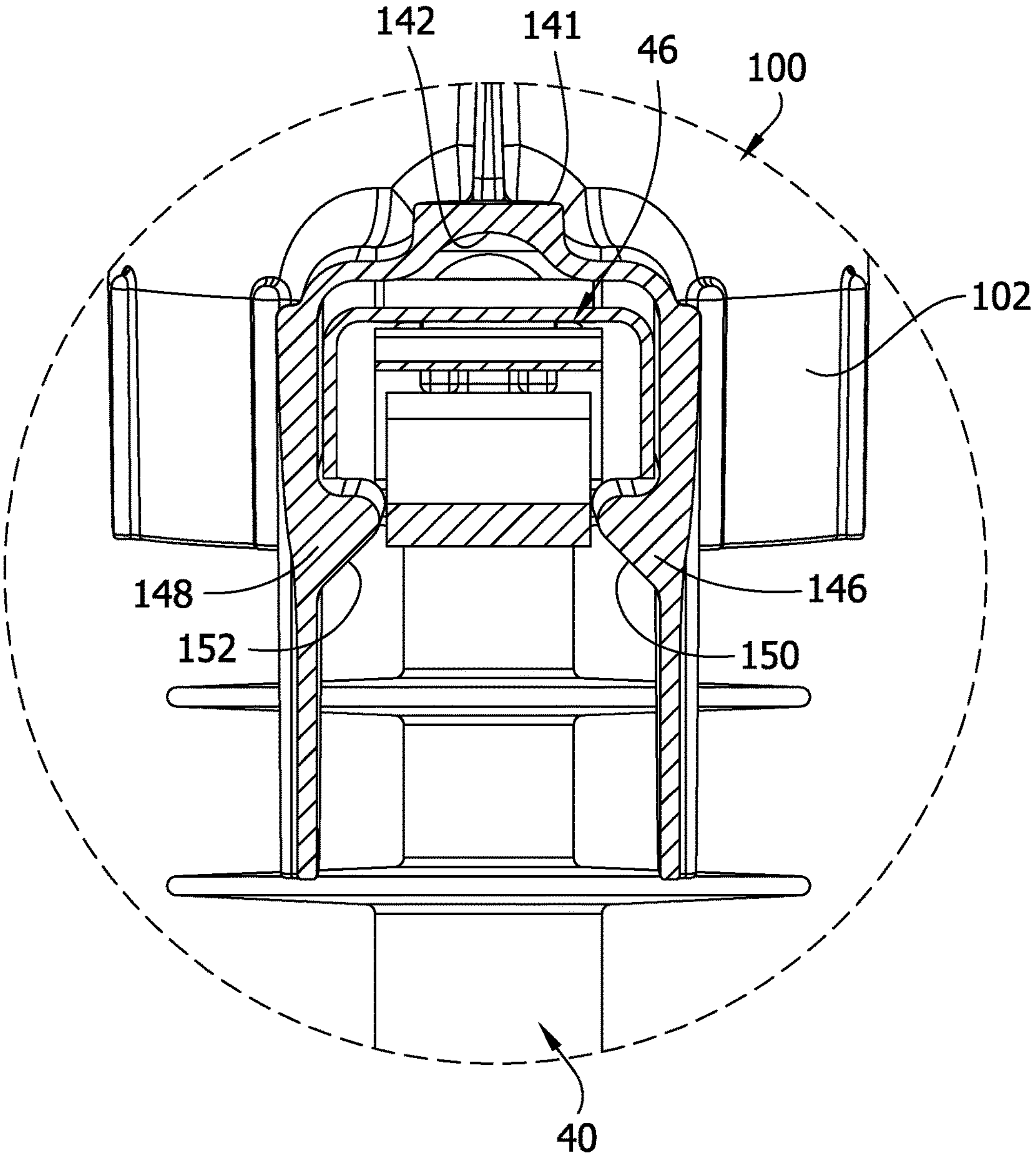
FIG. 11 is an enlarged view of a portion of the section of FIG. 10.
Figure 12:
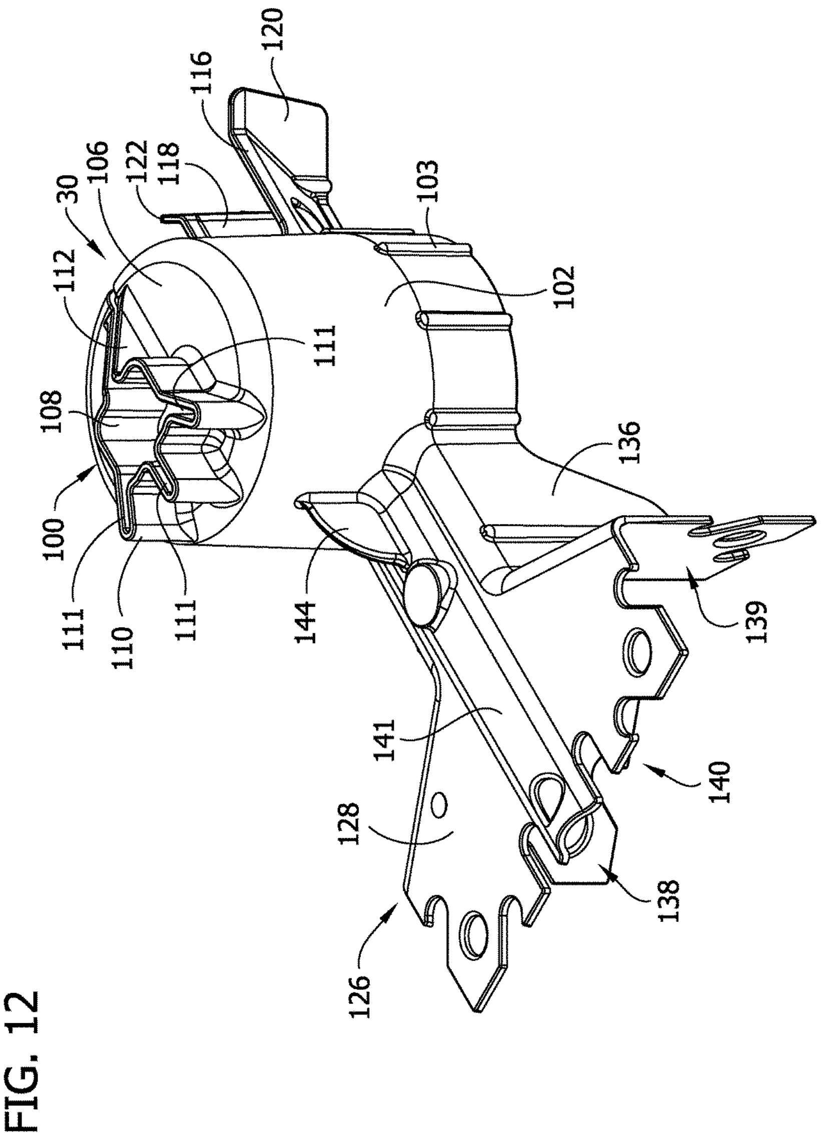
FIG. 12 is a front perspective of the cutout cover.
Figure 13:
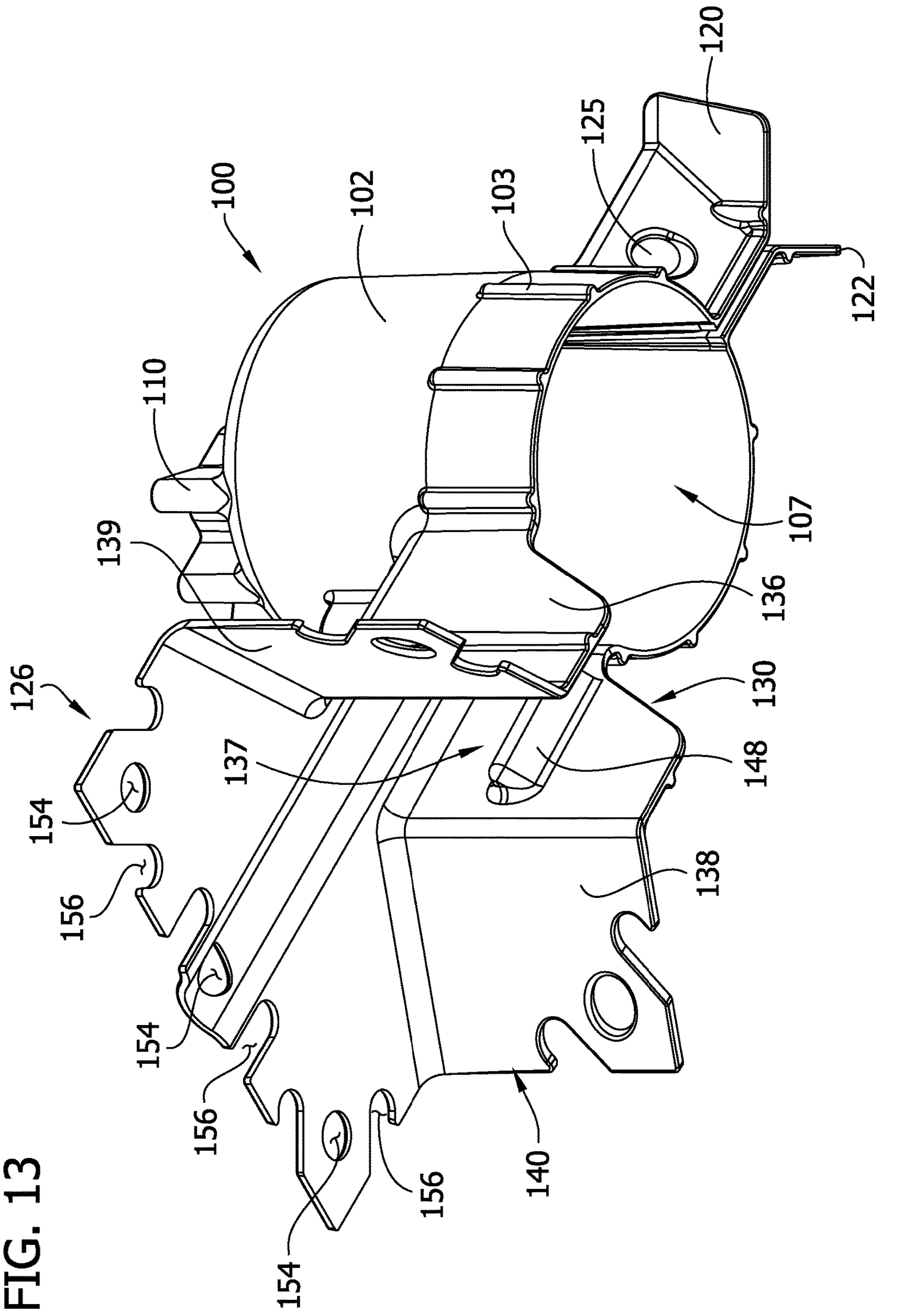
FIG. 13 is a front bottom perspective thereof.
Figure 14:
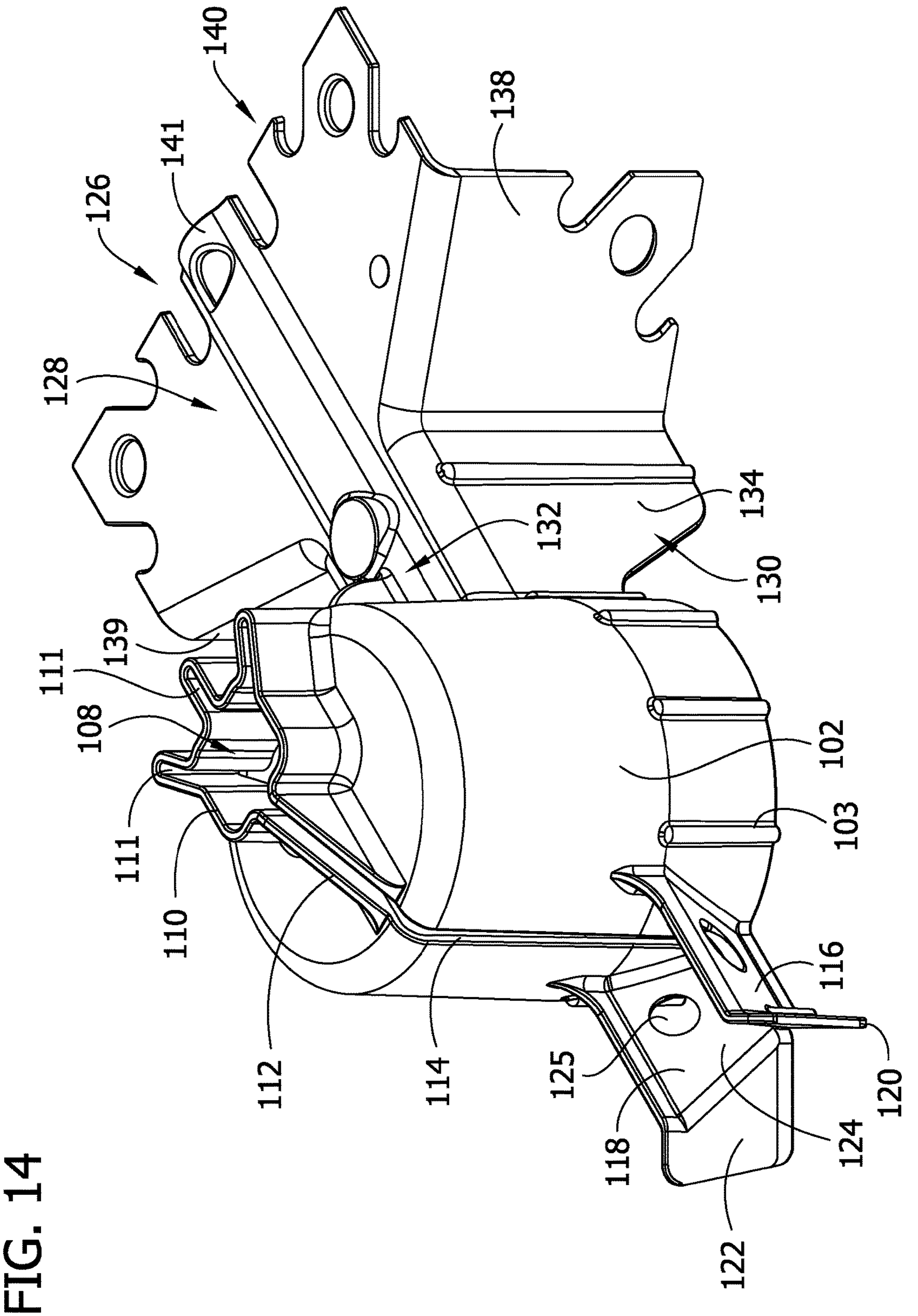
FIG. 14 is a rear perspective thereof.
Figure 15:
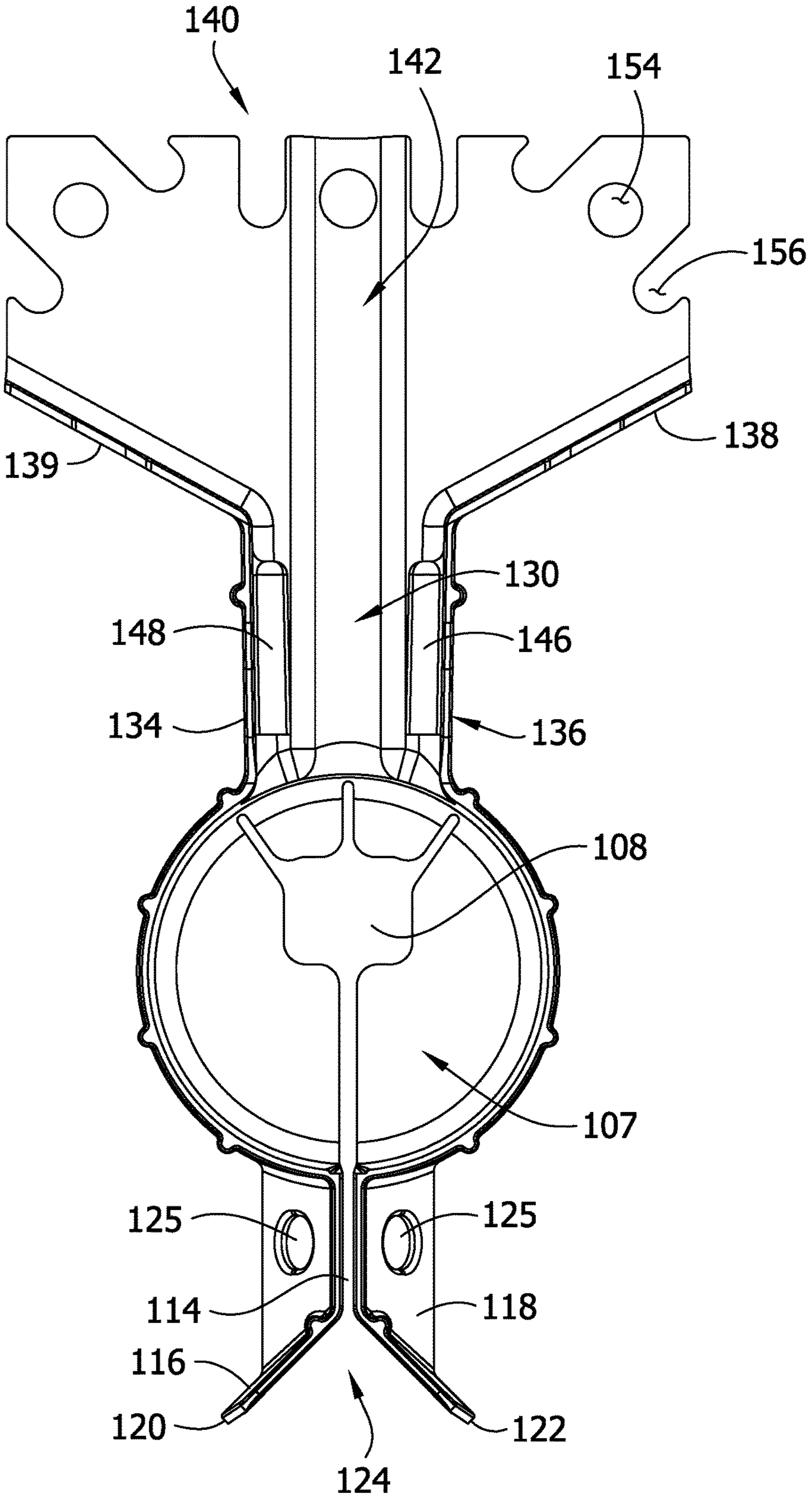
FIG. 15 is a bottom view thereof.
Figure 16:
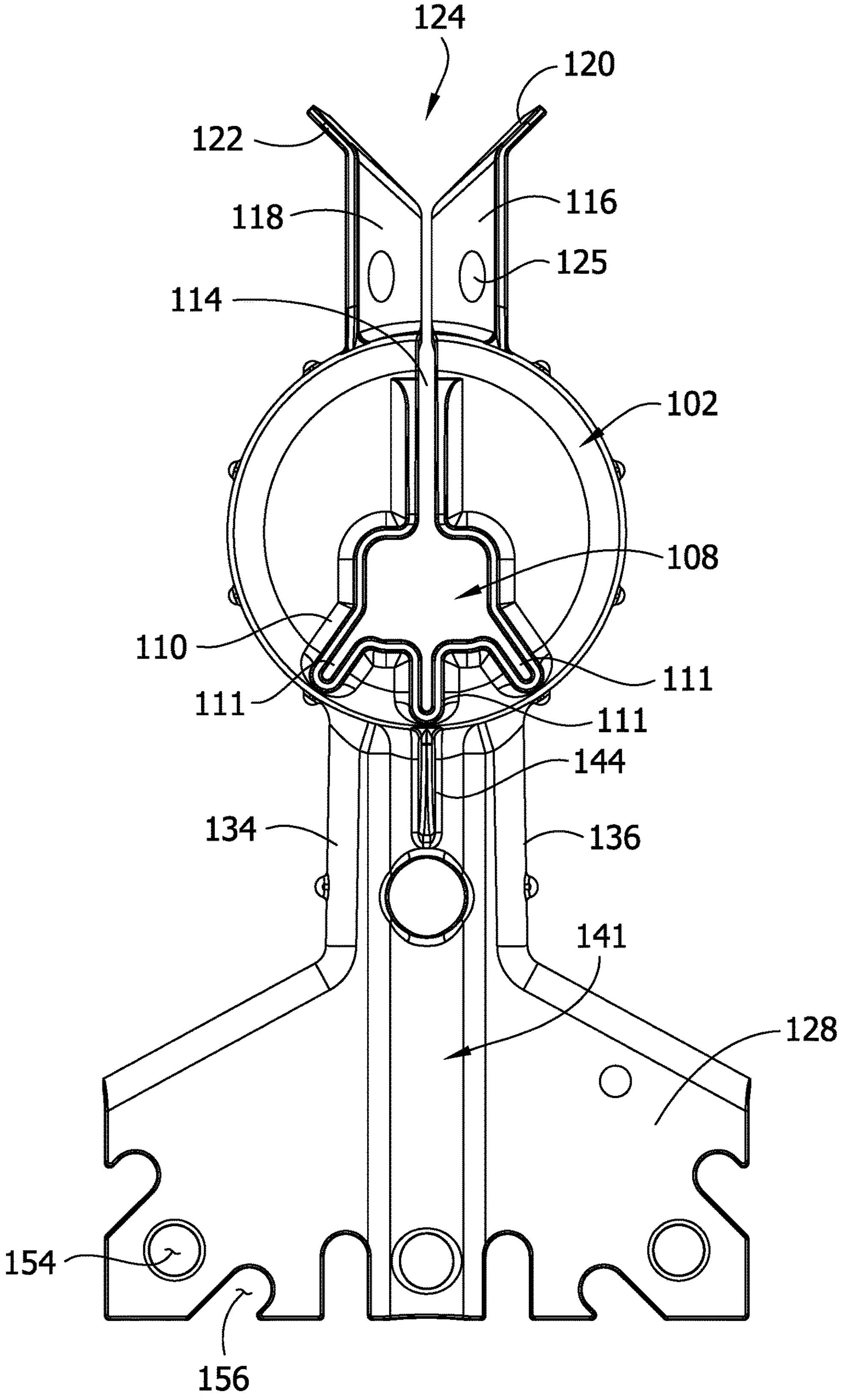
FIG. 16 is top view thereof.
Figure 17:
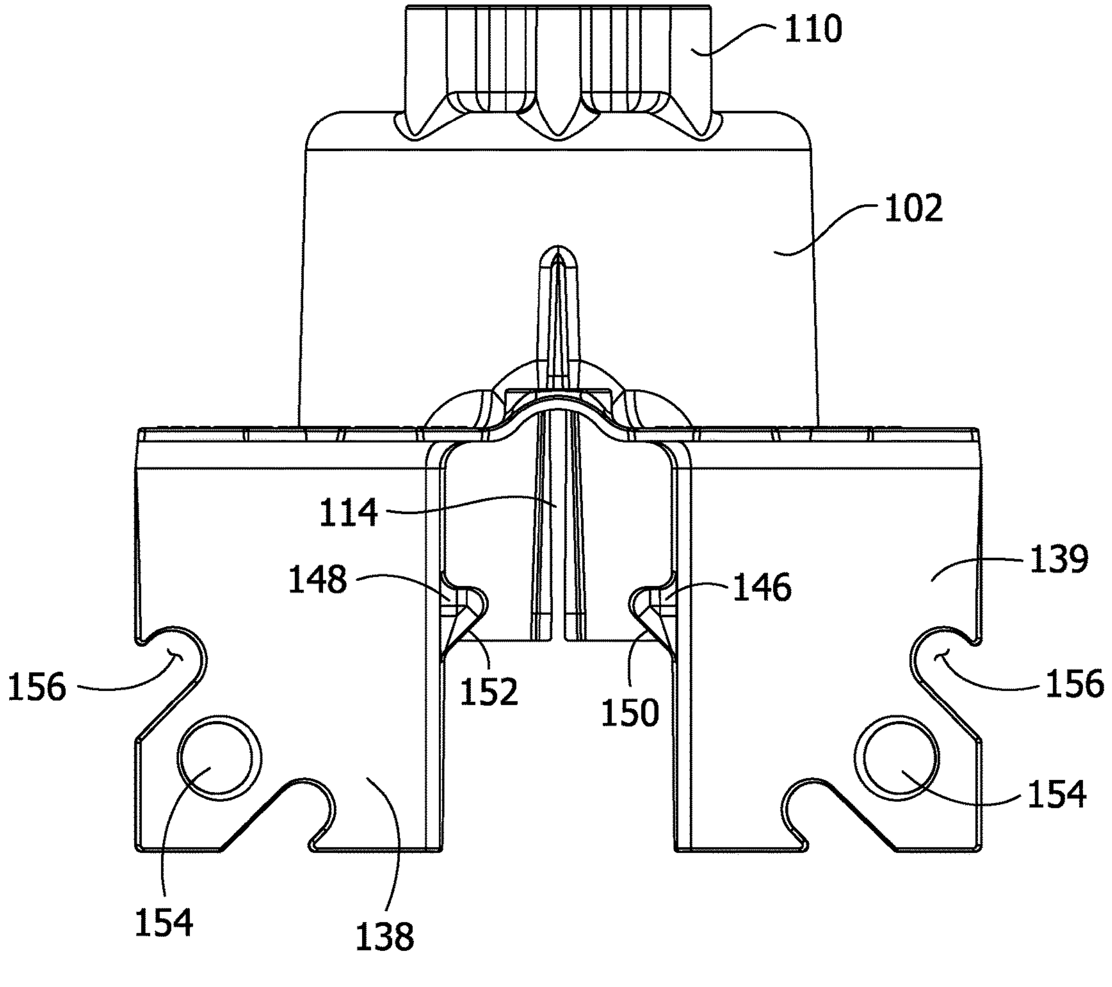
FIG. 17 is a front elevation thereof.

As indicated by the arrow in FIG. 5, the cover is urged down on the assembly. As best seen in FIGS. 7, 10 and 11, the sloped or angled walls 150, 152 of the detents 146 and 148, respectively, function as ramps to allow the detents to slide down over structure adjacent to the upper contact, for example, over sleet hood 46, spreading apart the throat 130 until the detents slide below the sleet hood and are biased toward each other under the sleet hood or other structure by the resilient quality of the cover material. If a harder polymer or plastic is used to form the cover, when the detents are properly positioned, as shown in FIGS. 10 and 11, there can be an audible and/or tactile indication that assures the installer the cover is properly positioned on the fuse cutout assembly. Even if a softer polymer is employed in the cover or the detents, the installer will be able to feel the detents positively engage the upper contact structure. The detents provide a positive indication the cover is properly installed. The detents abut the bottom of the sleet hood or other structure to keep the cover from being dislodged by winds up to 70 mph or by wildlife.

It will be noted that in the illustrated embodiment, the detents are shown to engage a sleet hood. This is shown for purposes of simplicity and convenience because many modern fuse cutout assemblies employ a sleet hood. However, it is intended that the cover 30 can be used with any fuse cutout assembly, even those without a discrete sleet hood. In those situations, the cover 30 is designed to slide down over and engage other structure or structures at the upper end of the fuse cutout assembly, such as an electrical contact, a brace, a frame member, or any other structure. Hence, the term sleet hood is representative of any structure that can accommodate the cutout cover. The cover is not limited to use on fuse cutouts having a sleet hood.

It will be appreciated that the detent arrangement secures the cover in place without the need for any clips, buttons, ties, inserts or other apparatus. Also as seen in FIG. 11, the longitudinal channel 142 under the longitudinal brace 141 provides space for the rivet 52 to pop up into the channel when the fuse holder is snapped into the spring biased upper contact. This clearance allows the fuse holder to be properly closed with the cover 30 in place.

As seen in the drawings, when the cover 30 is properly installed, there is very little clearance or gap between the cover and the cutout assembly, leaving little room for invasion by animals or birds, dirt, or debris. The top wall 128 extends out over the fuse cutout assembly and the perpendicular walls 138 and 139 to provide side barriers so as to shield the cutout from the elements and prevent access by wildlife. There is no bottom wall at mouth 140 and hence no structure on which a squirrel or bird can build a nest. However, the cover 30 provides access to the pull ring 64 and the hooks 54 and 56 with a load break tool or hot-stick or other tool at the mouth 140. The fuse tube can swing open and closed with the cover 30 in place.

As discussed above and illustrated in FIGS. 18-20, it is often necessary to employ a load break tool with a fuse cutout assembly. When installed, the cutout cover 30 allows access to the cutout assembly with a load break tool. The technician can access both the hooks and the pull ring with the load break tool at mouth 140. But the cutout cover 30 does not create any openings or voids for access or nest building by wildlife. It is a significant advantage to have access yet protection against unwanted intrusion.

Figure 22:
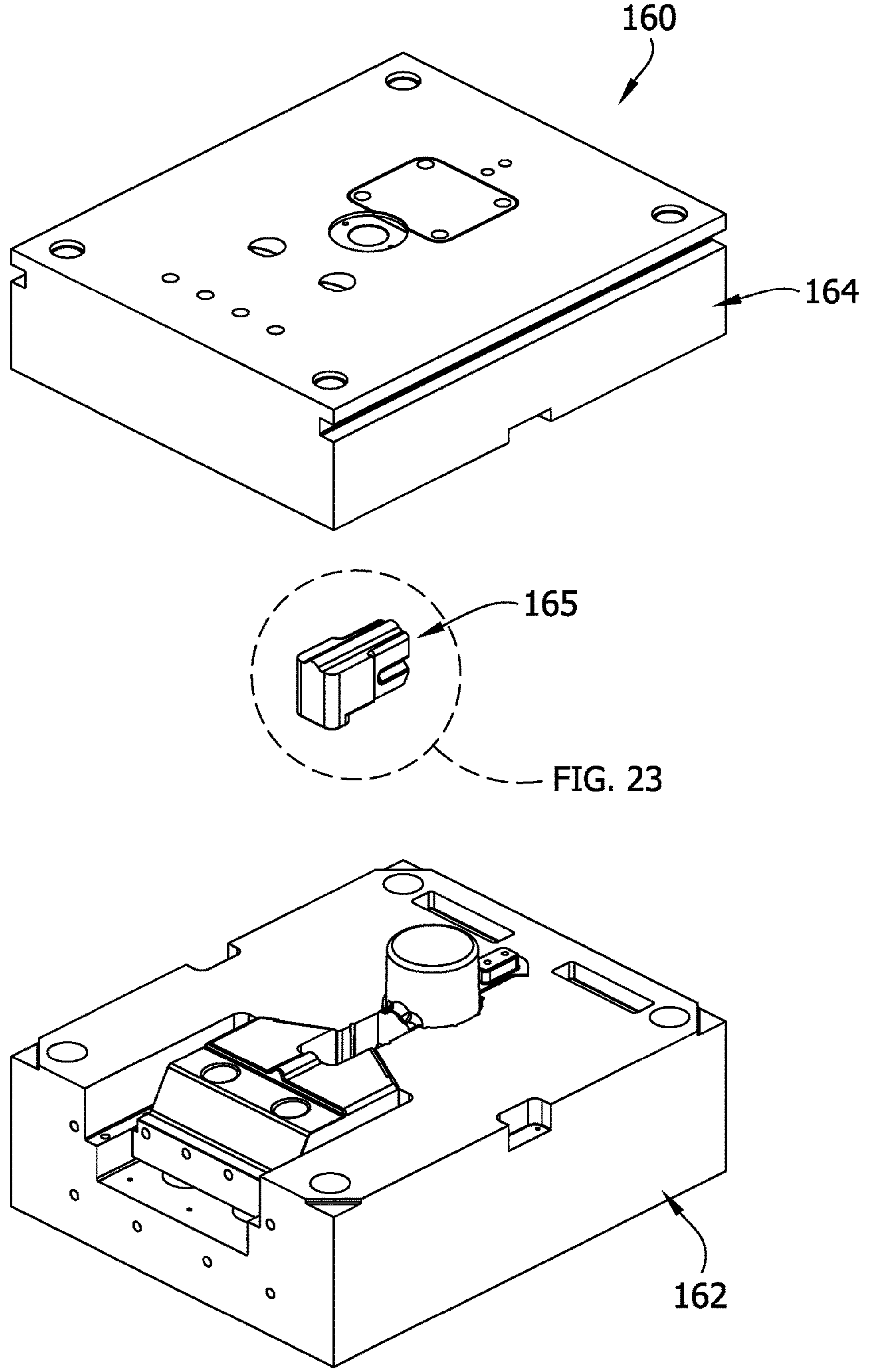
FIG. 22 is an exploded view of the cavity mold apparatus showing a first interchangeable detent mold part.
Figure 23:
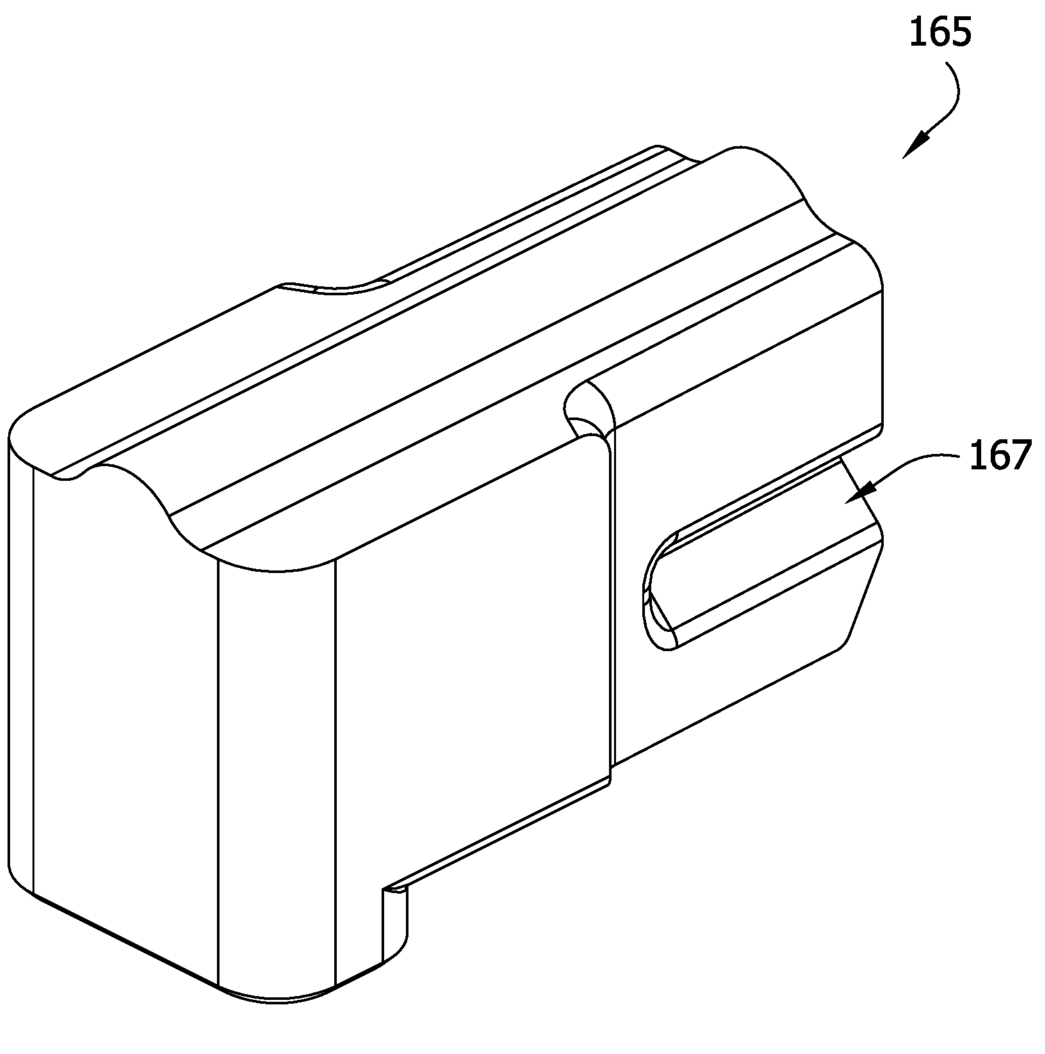
FIG. 23 is an enlarged, perspective view of the first interchangeable detent mold part.
Figure 24:
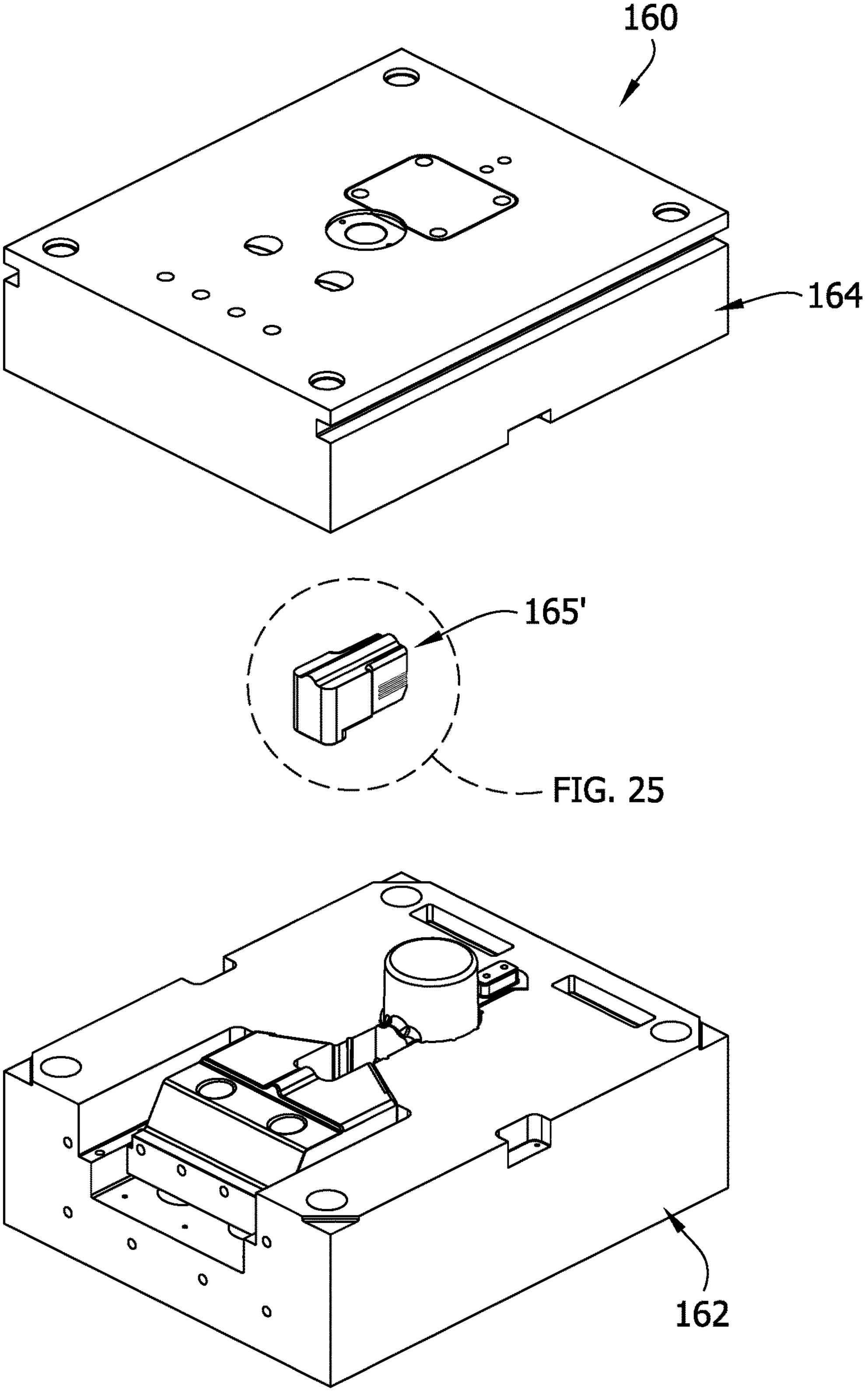
FIG. 24 is an exploded view of the cavity mold apparatus showing a second interchangeable detent mold part.
Figure 25:
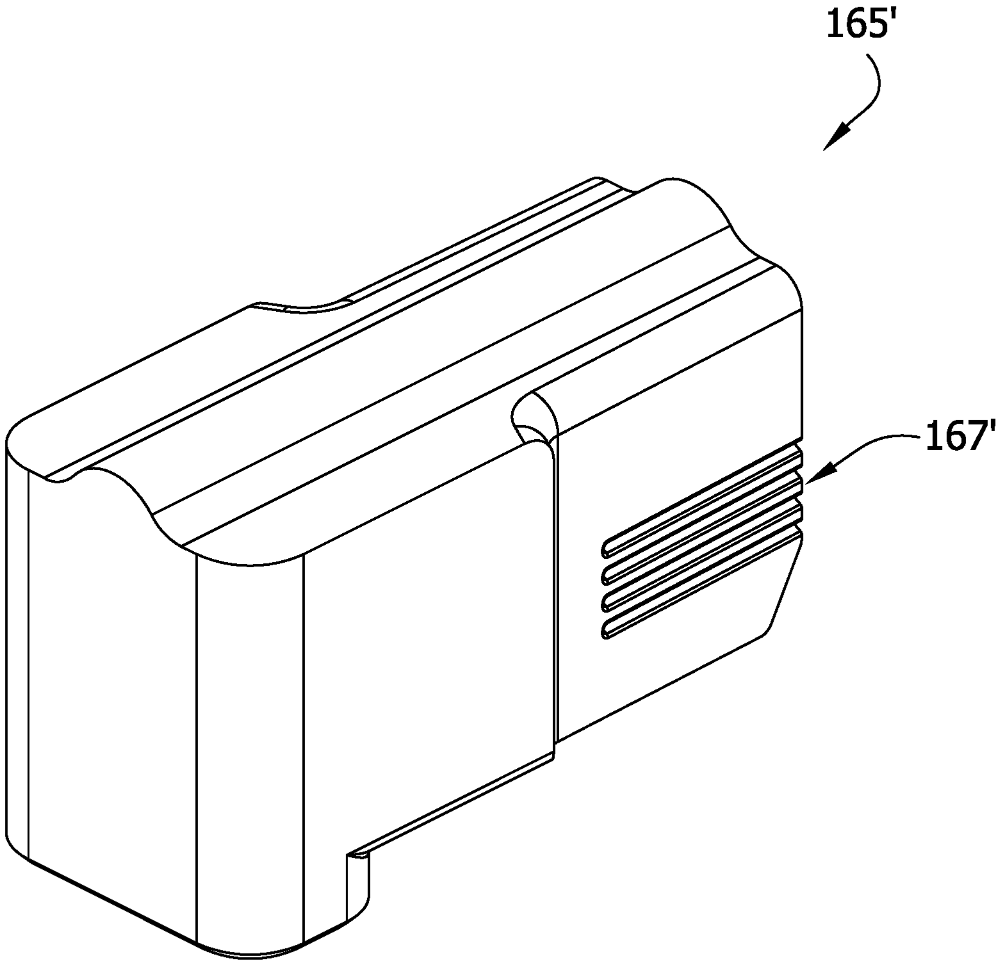
FIG. 25 is an enlarged perspective of the second interchangeable detent mold part.

Desirably, the cover 30 is molded from a resilient, flame-retardant, UV resistant, polymer material, generally in a cavity mold. The cover is resilient, relatively flexible, non-conductive, strong, and durable. FIGS. 21 through 25 illustrate one method of making the cover 30. The cover 30 generally is cavity molded from resilient, dielectric polymer material in a cavity mold, indicated generally by the number 160. As seen in FIG. 22, the mold 160 has a bottom section 162 and a complementary top section 164. However, the mold may include interchangeable detent mold inserts, such as insert 165. The insert 165 includes opposed cavities, such as cavity 167, one of which may be seen in FIG. 23. The cavities 167 correspond to the size and/or configuration of the detents 146, 148 the manufacturer desires to include in the throat 130 of the cover. FIGS. 24 and 25 illustrate a different detent molding insert 165' that results in a different configuration of a detent. In this embodiment, the resulting detent molded into the throat 130 comprises longitudinal rows of parallel ridges (formed by cavities 167' shown in FIG. 25) that can slide down over the sleet hood at installation. Depending upon the material characteristics, the detent will snap or grate when installed informing the installer the cover is properly seated and secured. Thus, the installer can determine the cover is properly installed.

In another aspect, the detents may be formed by over-molding or co-molding. The material used for the detents may be different from the material used for the rest of the cover. For example, the detents could be co-molded or over-molded from a more pliable or softer material than the other aspects of the cover. In one embodiment, the co-material can be added to the mold. In another embodiment, the detent can be molded from one material, the molded detent can be introduced to the mold, and the entire cover can be molded around or on the detent. Other methods of molding can be used.

It will be understood that fuse cutout assemblies come in different widths and depths and styles, and that by employing interchangeable inserts in the mold, the size and slope angle and composition of the detents can be varied without the use of a completely different mold. Any configuration, size, orientation or composition of detents can be formed from the same mold merely by changing the mold insert.

Figure 26:
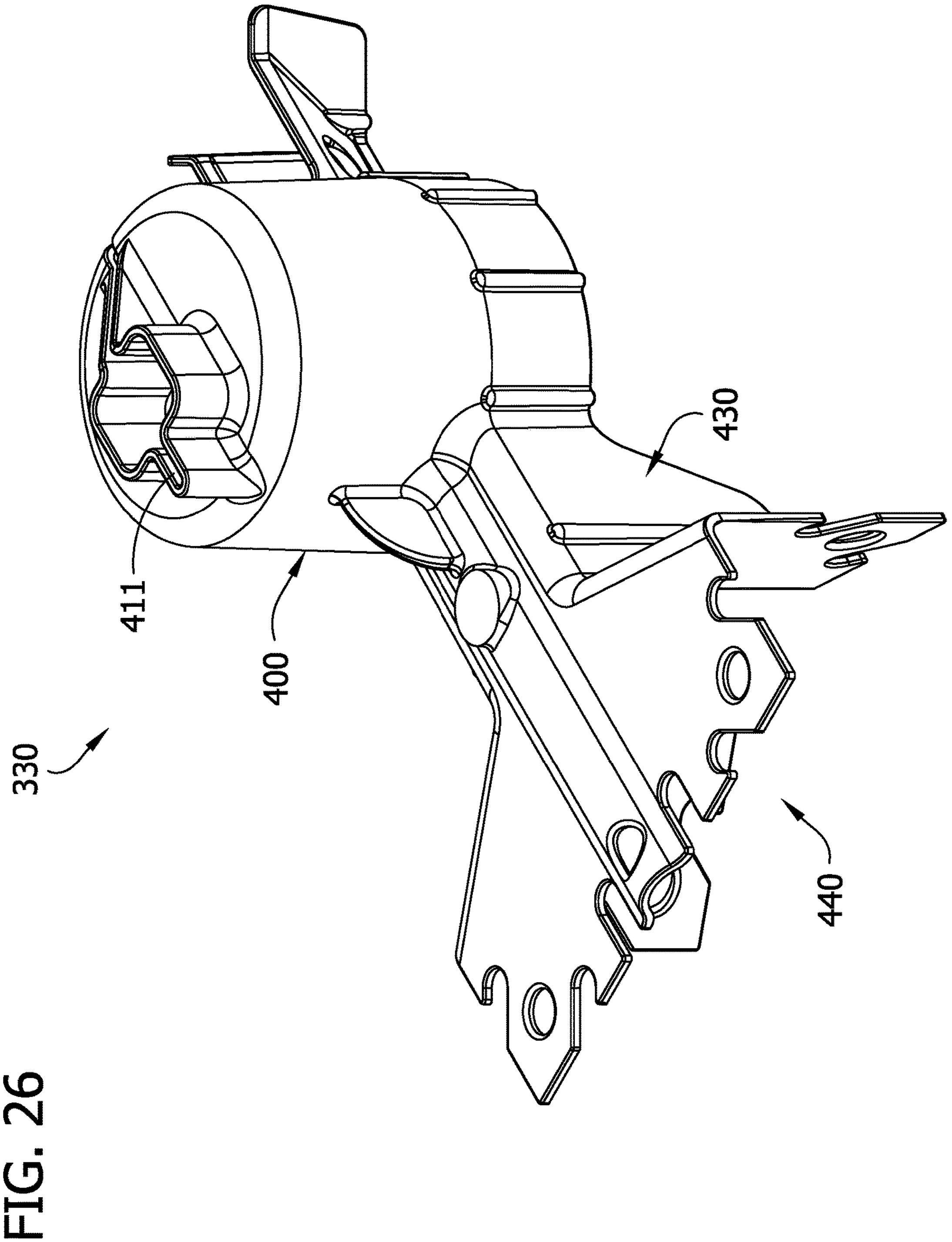
FIG. 26 is a perspective of a cutout cover of a second embodiment.

Referring to FIG. 26, a second embodiment of a fuse cutout assembly cover is indicated generally by the reference number 330. The cover has the same construction as the cover 30. For example, the cover includes an insulator cover end 400, an intermediate portion 430, and a shield end having a mouth 440. In this embodiment, one gusset 411 is provided instead of three.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A fuse cutout cover for a fuse cutout assembly including a fuse and an upper contact assembly for engaging an upper end of the fuse, the cover comprising:

an insulator cover configured for covering at least an upper end of the insulator;

a contact assembly shield configured for shielding the upper contact assembly; and an intermediate portion operatively connecting the insulator cover and the contact assembly shield and molded as one piece of material with the insulator cover and contact assembly shield, the intermediate portion including at least one detent configured for catching on a portion of the fuse cutout assembly for retaining the fuse cutout cover on the fuse cutout assembly;

the contact assembly shield having a top wall portion and side wall portions defining, the mouth opening in a direction away from the insulator cover, each of the top wall portion and side wall portions having holes therein sized and shaped for receiving a hot stick tool to manipulate the fuse cutout cover.

2. A fuse cutout cover as set forth in claim 1, wherein the upper wall portion is generally horizontal and the side wall portions extend down from the upper wall portion.

3. A fuse cutout cover as set forth in claim 2, wherein the side wall portions extend in respective directions away from the intermediate portion and away from each other.

4. A fuse cutout cover as set forth in claim 1, wherein the side wall portions include slots adjacent said holes, the holes and slots defining hole and slot arrangements, each hole and slot arrangement including one of said holes and at least one of said slots, each hole and slot arrangement being configured for gripping by the hot stick tool, the hole and slot arrangements being arranged with respect to each other to receive the hot stick tool from different angles.

5. A fuse cutout cover as set forth in claim 1, wherein the mouth has an upper peripheral edge margin section, the upper peripheral edge margin section including at least two of said holes, the upper peripheral edge margin section including slots adjacent said at least two holes, said holes and slots defining hole and slot arrangements, each hole and slot arrangement including one of said holes and at least one of said slots, the hole and slot arrangements being arranged with respect to each other in different orientations for receiving the hot stick tool from different angles.

6. A fuse cutout cover for a fuse cutout assembly including an insulator, a fuse, and an upper contact assembly for engaging an upper end of the fuse, the cover comprising:

an insulator cover configured for covering at least a portion of an upper end of the insulator;

a contact assembly shield configured for shielding at least a portion of the upper contact assembly;

an intermediate portion operatively connecting the insulator cover and the contact assembly shield, the intermediate portion including at least one wall section and at least one detent configured to engage the fuse cutout assembly to retain the cutout cover on the fuse cutout assembly in a position in which the insulator cover portion covers at least said portion of the upper end of the insulator and the contact assembly shield shields at least said portion of the upper contact assembly, the at least one wall section being formed of a first material, and the at least one detent being formed of a second material different from the first material.

7. A fuse cutout cover as set forth in claim 6, wherein the second material is softer than the first material.

8. A fuse cutout cover as set forth in claim 6, wherein the second material is more pliable than the first material.

9. A fuse cutout cover as set forth in claim 6, wherein the intermediate portion comprises a throat including said at least one wall section, said at least one wall section including an upper wall section and opposite side wall sections extending downward from the upper wall section.

10. A fuse cutout cover as set forth in claim 9, wherein the at least one detent is located on an inner surface of one of the side wall sections.

11. A fuse cutout cover as set forth in claim 10, wherein the at least one detent is configured to snap into retaining position with respect to the fuse cutout assembly.

12. A fuse cutout cover as set forth in claim 10, wherein the throat is configured for fitting over a sleet hood of the fuse cutout assembly.

13. A fuse cutout cover as set forth in claim 9, wherein the at least one detent comprises a first detent and a second detent, the first detent being located on an inner surface of one of the side wall sections, and the second detent being located on an inner surface of the other of the side wall sections.

14. A fuse cutout cover as set forth in claim 6, wherein the contact assembly shield defines, the mouth opening in a direction away from the insulator cover, the mouth being configured to permit the upper end of the fuse to pivot away from the upper contact assembly when the cutout fuse cover is installed on the cutout fuse assembly.

15. A fuse cutout cover as set forth in claim 14, wherein the mouth has a peripheral edge margin including peripheral edge margin sections extending in different planes, the peripheral edge margin sections including holes and slots configured for gripping by an installation tool and arranged for receiving the installation tool from different angles.

16. A fuse cutout cover as set forth in claim 6, wherein the insulator cover has a split to permit the insulator cover to be resiliently deformed to receive portions of the cutout assembly into the insulator cover, the split including plural living hinges defining locations where the insulator cover deforms.

* * * * *